US007095677B2

(12) United States Patent
Canning

(10) Patent No.: US 7,095,677 B2
(45) Date of Patent: Aug. 22, 2006

(54) CROSSPLOT ANALYSIS OF A.V.O. ANOMOLIES IN SEISMIC SURVEYING

(75) Inventor: Anat Canning, Kfar Saba (IL)

(73) Assignee: Paradigm Geophysical, Rue Schiller (LU)

( * ) Notice: Subject to any disclaimer, the term of this patent is extended or adjusted under 35 U.S.C. 154(b) by 321 days.

(21) Appl. No.: 10/445,331

(22) Filed: May 27, 2003

(65) Prior Publication Data

US 2004/0240321 A1   Dec. 2, 2004

(51) Int. Cl.
*G01V 1/28* (2006.01)
*G01V 1/34* (2006.01)

(52) U.S. Cl. .............................. 367/47; 367/73; 367/38; 702/14

(58) Field of Classification Search .................. 367/38, 367/47, 73; 702/14, 16
See application file for complete search history.

(56) References Cited

U.S. PATENT DOCUMENTS 5,440,525 A * 8/1995 Dey-Sarkar et al. .......... 367/52
5,661,697 A * 8/1997 Swan et al. .................... 367/47

OTHER PUBLICATIONS

Mahob and Castagna. "AVO hodograms and polarization attributes." The Leading Edge, Jan. 2002.*
Keho, Lemanski, Ripple, and Tambunan. "The AVO hodogram: Using polarization to identify anomalies." The Leading Edge, Nov. 2001.*
Cambois. "A new approach to the fluid factor leads to elastic inversion without shear log.".*
Castagna. "AVO analysis." CSEG Recorder, Jun. 2001.*
Furniss. "Direct Hydrocarbon Detection Made Easy." Preview, Aug. 2002.*
Russell and Lines. "Neural Networks and AVO." CSEG Geophysics 2002.*
Foster, Keys, and Reilly. "Another Perspective on AVO Crossplotting." The Leading Edge, Sep. 1997.*
Simm, White, and Uden. "The anatomy of AVO crossplots." The Leading Edge, Feb. 2000.*
Anderson. "The Hodogram as an AVO attribute.".*

* cited by examiner

*Primary Examiner*—Jack Keith
*Assistant Examiner*—Scott A. Hughes
(74) *Attorney, Agent, or Firm*—Pearl Cohen Zedek Laizer, LLP

(57) ABSTRACT

A method of seismic data analysis to provide clustering of A.V.O. data into A.V.O. anomaly types, the method comprising: obtaining successive values of a plurality of seismic attributes, each seismic attribute comprising a respective property of a seismic reflection event, grouping said values using a running window of a predetermined size into a plurality of groups, for each group identifying first and second parameters corresponding to said first and second attributes, and plotting each group as a single event based on said group parameters, said group parameters having been selected to cause clustering of said seismic reflection events on said plot according to the presence or absence of A.V.O. anomalies.

38 Claims, 24 Drawing Sheets
(23 of 24 Drawing Sheet(s) Filed in Color)

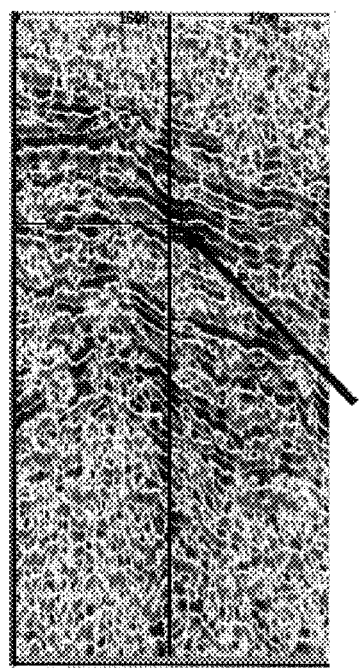
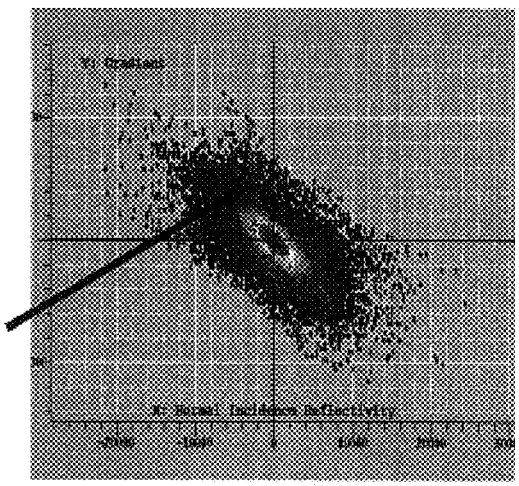
Fig. 11a  Fig. 11b
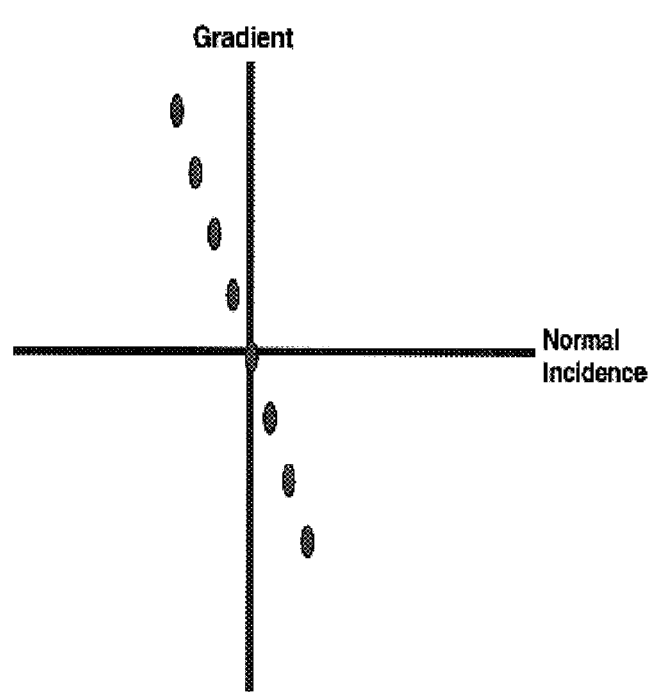
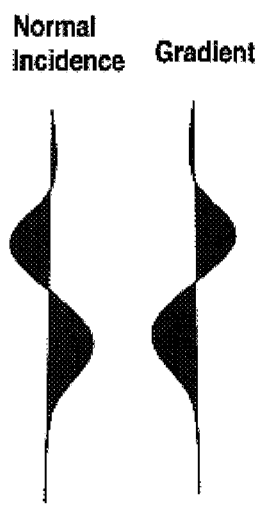
Fig. 12a  Fig. 12b

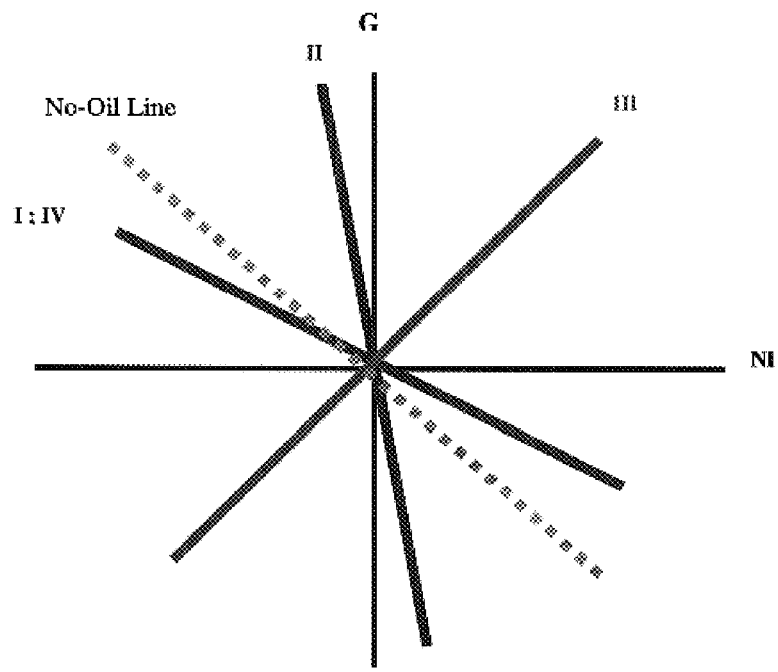
Fig. 13
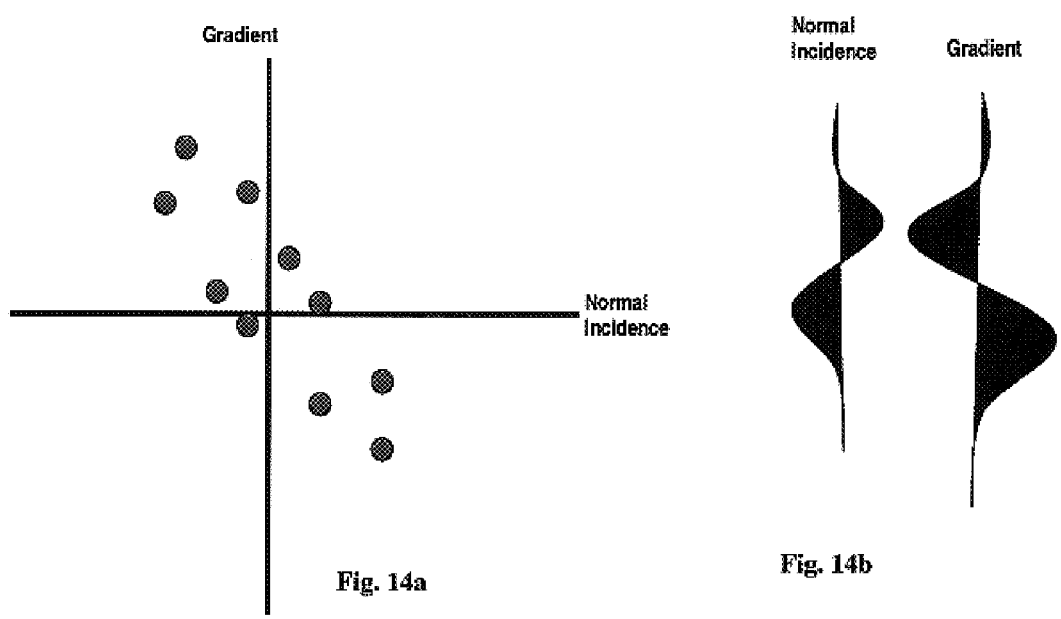
Fig. 14a
Fig. 14b

Fig. 32a
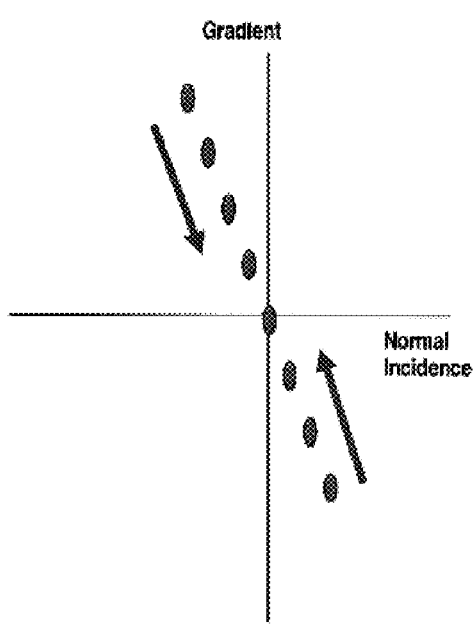
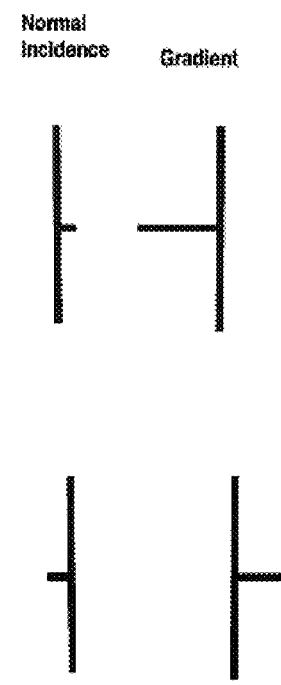
Fig. 32b

Unconstrained
Constrained
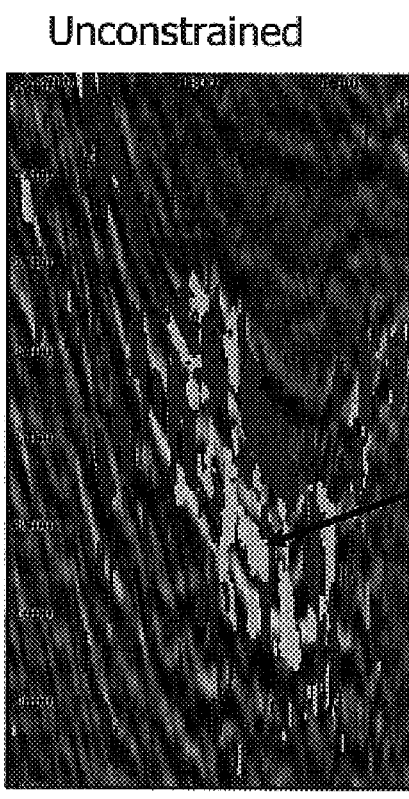
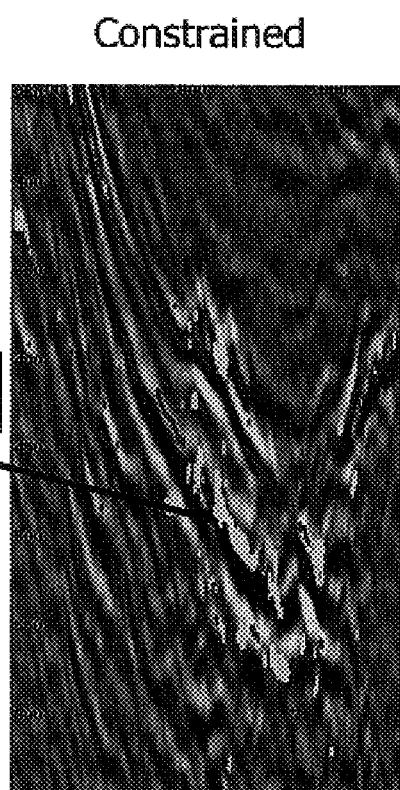
Reservoir Layer
Fig. 33
Fig. 34

CROSSPLOT ANALYSIS OF A.V.O. ANOMOLIES IN SEISMIC SURVEYING

FIELD AND BACKGROUND OF THE INVENTION

The present invention relates to improvements to crossplot analysis of A.V.O. anomalies in seismic surveying and, more particularly, but not exclusively to apparatus and a method for identifying an A.V.O. anomaly indicative of the presence of oil or gas, via an improved A.V.O. crossplot.

Seismic surveying is the basic technology used for imaging the subsurface for oil exploration. Seismic surveying involves the transmission of sound energy into the subsurface and recording the echoes that are reflected from the boundaries between the layers in the subsurface. The recorded signal is processed and displayed as seismic sections. FIG. 1 is an example of a typical seismic section in which the vertical axis represents depth and the horizontal axis represents surface distance. The seismic section in FIG. 1 is a vertical cross-section of the sub-surface, showing layers 10, faults 12, folds 14 and other subsurface features. Using such sections a geologist is able to see the geometry of the layers at depth, and can suggest likely locations for drilling test bores to find oil or gas.

In addition to the geometry of the layers, the seismic section can obtain a certain amount of information on the composition of the rocks in the subsurface by analyzing the amplitude (the strength) of the reflected signal. The amplitude or strength of the reflected signal is governed by the difference in the physical properties between the layers respectively above and below the boundary causing the given reflection. A typical boundary is shown schematically in FIG. 2. A layer atop the boundary is composed of rocks having a first density and elasticity values, and a layer below the boundary is composed of rocks having a second density and second elasticity values. The differences between the densities and the elasticity values contribute to the amplitude of the reflected signal and thus carry information about the physical properties of the layers.

In standard seismic surveying each subsurface point is illuminated from different directions, that is to say illumination angles, each direction producing a seismic section (constant angle section). As the sections show the same slice they can be superimposed or stacked. Stacking of the sections serves to de-emphasize differences between the sections whilst similarities are enhanced. As the differences are most likely noise the stacking procedure tends to enhance the signal to noise ratio. The stacking procedure is known in the art as CMP stacking, and is a standard method of enhancing the Signal to Noise ratio.

The multi-directional illumination enables analysis of the amplitude of reflection at a given point as a function of the angle of illumination. Such analysis is carried out before stacking the data. Normally, when doing so, it is apparent that the amplitude decreases with increasing angle. That is to say, the greater the angle of illumination and consequently of reflection, the smaller the amplitude of the received signal. About 20 years ago it was discovered that when gas (and sometimes oil) is present in the layer, the amplitude behaves in an anomalous way, and in fact tends to increase as a function of the angle of illumination, and likewise of the reflection angle. The increasing amplitude phenomenon is known as an A.V.O. anomaly. A.V.O. is an abbreviation for Amplitude Versus Offset.

Reference is now made to FIG. 3, which is a schematic diagram illustrating a vertical section through the ground having a shale layer, a gas—sand layer, and another shale layer. Alongside each of the layer boundaries are shown a series of seismic traces illustrating signal amplitudes as the reflection angle increases to the right. The figure illustrates a basic A.V.O. model in the case of reflection from a gas—sand layer boundary. In the figure, $\sigma$—Poisson's ratio, is given for each layer as representative of the elastic properties of the rock. As will be seen, at the upper, shale—gas, boundary, the amplitude increases from small negative to large negative, and at the lower, gas—shale, boundary, the amplitude increases from low positive to high positive.

A.V.O. anomalies are usually categorized into 4 different classes, three of them are illustrated in FIG. 4, which shows for each class the changes in amplitude of a received signal as the reflection angle increases to the right:

Class I: Amplitude at zero angles is positive, and it becomes smaller as the angle increases.

Class II: Amplitude at zero angles is close to zero, and it becomes more negative as the angle increases.

Class III: Amplitude at zero angles is negative, and it becomes more negative as the angle increases.

Class IV: Amplitude at zero angles is negative, and it becomes larger (more positive) as the angle increases.

Identification of A.V.O. anomalies has become a very important tool in oil and gas exploration. When an A.V.O. anomaly exists, it is a strong indication of the presence of gas. An A.V.O. anomaly is not an absolute guarantee of oil or gas but it is sufficient to provide a very significant impact on the drilling success rate.

The identification of A.V.O. anomalies within the seismic data is not a simple task. Seismic 3-D surveys are very large and contain gigabytes and even terabytes of data. To perform A.V.O. analysis it is necessary to determine how the amplitude at each subsurface point behaves as a function of the reflection angle. In classic seismic processing (not for AVO purposes), the process of stacking serves to average out the amplitude and reduces the amount of information by a great amount. For AVO analysis, stacking is not an option as we seek to see the changes of amplitude before stacking. Instead of inspecting each AVO gather (data at a single surface location as a function of reflection angle) a lengthy and complex process, it is common to create what are known as A.V.O. attributes. A.V.O. attributes normally measure two A.V.O. parameters: The amplitude at zero reflection angles (Normal Incidence—NI), and the rate of change of amplitude as the reflection angle changes (Gradient—G). A.V.O. anomalies can be directly identified using these two attributes. Reference is now made to FIG. 5, which illustrates side by side a plot of amplitude at zero reflection angles (NI), on the left (a) and of gradient on the right (b).

In FIG. 5 color coding is used to indicate the amplitude of the signal. White indicates small amplitude. Yellow to orange are normal amplitudes, red indicates large positive amplitude and blue indicates large negative amplitude. The presence of an A.V.O. anomaly is indicated wherever large amplitudes on the gradient graph b) correspond to small amplitudes on the NI graph a). The region marked by the black circle is such a region. Other regions of high gradient in b) correspond to high NI on the amplitude graph a) and therefore are disregarded. The region marked by the circle is the phenomenon that interests geologists. It indicates an A.V.O. anomaly and thus a high probability of the presence of gas.

Double plots of the kind shown in FIG. 5 can disclose A.V.O. anomalies, howeverdue to the size of typical surveys it is not practical for the matching to be carried out manually by simple inspection. A geologist may often miss an AVO anomaly when inspecting dual attribute datasets. Automated techniques are called for to enable the analysis of all AVO anomalies that are present in the dataset, and classify them according to the standard AVO classifications. Instead a different technique known as A.V.O. crossplotting is used in standard automated or partly automated processes for identifying A.V.O. anomalies within a 2-D or 3-D seismic dataset. Crossplotting is a mathematical mapping process that can easily be performed by computer and it provides a visual output. In AVO crossplotting, the same two A.V.O. attributes as used in the double plot, namely NI and G, may be used. Each subsurface point is mapped uniquely into a point in crossplot space, which is simply a two-dimensional space having, as axes, NI and G. Mapping of AVO attribute data into the crossplot space is done as follows: For a given subsurface point, the amplitude (a) of the data point on the NI attribute is extracted; also the amplitude (b) from the G attribute is extracted. The data is then mapped onto a single point (a, b) in the crossplot space.

Reference is now made to FIG. 6, which is a simplified diagram illustrating a crossplot space onto which a point (a,b), representing an NI value of a and a G value of b has been plotted. Mapping onto such a space transforms each class of an AVO anomaly onto a unique part of the crossplot space. Thus, regions in the crossplot space are uniquely associated with a specific AVO class, or of course with no class at all, for examplemud and rocks.

AVO crossplotting is a very useful tool for classifying and mapping AVO anomalies. However, one disadvantage is that, unlike the double plotting of FIG. 5, the crossplot itself loses the location information of the point mapped. Thus, in order to make successful use of the crossplot, it is necessary to map AVO data firstly to the crossplot space as described above so that it can be categorized into its anomaly class or no anomaly, as appropriate. Then, once the point is categorized, the categorization is applied to the location from which the point is taken so that true subsurface location can be determined. Such a procedure is typically performed as part of a computer program, which maps from the crossplot space back to the attribute data, after the data has been classified in the crossplot space.

Ideally, it is possible to map each type of AVO anomaly to the identified locations in the crossplot space as shown in FIG. 7, which is an idealized version of the cross plot space, showing the various regions that correspond with the class 1–4 anomalies. The non-AVO anomaly data maps onto a line, the so-called no-oil or mud rock line which extends through the origin from upper left to lower right. The line is of negative slope to represent amplitude changes that decrease with reflection angle. Based on a-priori knowledge of how AVO anomalies map in the crossplot space, as represented in FIG. 7, it is possible to classify all seismic data points according to a corresponding AVO signature. Using AVO crossplotting, it is possible to map all AVO anomalies in 3-D. By following the above procedure, it is possible to provide a categorization for each data point automatically, even in a very large terabyte range 3-D survey.

The problem with Conventional AVO Crossplotting

Unfortunately, reality is not as kind as FIG. 7 implies. Reference is now made to FIG. 8, which is a graph showing how an A.V.O. crossplot appears for a real large data set. In reality the separation of AVO anomalies from the rest of the data using AVO crossplotting does not work in most cases. That is to say the data does not cluster around the different regions, but rather forms a difficult to classify continuum. FIG. 8 is a crossplot of Normal Incidence (NI) versus Gradient (G) created from a 3-D dataset recorded over a large gas field. All the data is concentrated together and there is no way of reliably discriminating between AVO and non-AVO effects. In other words there is no formation of recognizable clusters that can be separated from one another.

Reference is now made to FIG. 9, which shows the regions of FIG. 7 superimposed upon the data of FIG. 8. In the dataset represented in FIGS. 8 and 9, there is inter alia a class II AVO anomaly. FIG. 10 shows the result of selecting the part of the data associated with the class II AVO, that is the data within the circle II, and tracing it back to the double graphs of FIG. 5 by highlighting. It can be seen from FIG. 10 that indeed the A.V.O. zone is identified correctly, but many points outside the anomaly are also marked.

Furthermore, it is not clear, simply from looking at FIG. 9 that a type II A.V.O. anomaly actually exists in the data. All points which are pink in FIG. 9 are marked pink on the attributes in FIG. 10. The situation illustrated in FIG. 10 is a very typical situation. The reason for this behavior is discussed in several papers and is explained well by Ross, 2000 and by Keho, 2000, the contents of which are hereby incorporated by reference.

Reference is now made to FIG. 11, which is a simplified diagram showing an attribute only graph a) next to a cross-plot b) and illustrating how the situation in FIG. 10 in fact arises. A rectangle at the origin of a) represents data from a class II anomaly. The data from within the rectangle in a) that is to say data of the clear class II AVO anomaly, is mapped onto the crossplot b). It would be expected from the analysis of FIG. 7 above that all of the data from within the rectangle is mapped to the class II anomaly region in b) but in fact this is not the case. The points are drawn in purple over the crossplot b). FIG. 11b clearly shows that in fact very little of the AVO data maps into the class II zone. Rather most of the purple points are distributed throughout the main cluster of data points and in fact seem to form up substantially about a straight line crossing the origin and having a negative slope.

To understand how AVO anomalies actually map to an NI-G crossplot, it is necessary to consider the effect of the original wavelet from which the imaging data is obtained and the effect of wavelet distortions with varying reflection angle. The wavelet is the shape of the source signal. A reflection from a subsurface interface is not a point reflection because the seismic signal has length in time. Hence, each reflection is contaminated by the shape of the source function—the wavelet. When taking into account the effect of the wavelet, a single NI-G event will not in fact map according to what is described in FIGS. 6 and 7, which turn out to be highly simplified. The event actually maps, in an ideal case, to a line in the crossplot space, as illustrated in FIG. 12a to which reference is now made. The slope of the line distinctively defines an AVO signature. FIG. 12b shows different points along the length of a wavelet which are all associated with a single AVO event. When these points are mapped to a crossplot as in FIG. 12a, they in fact form the line referred to above and shown in FIG. 12a.

Each type of AVO anomaly has a different slope, and the "No Oil" line is also mapped distinctively to a specific line in the crossplot space as shown in FIG. 13. FIG. 7 turns out to be an idealized picture that does not apply due to wavelet effects. A more realistic description of the AVO crossplot space and what is happening in practice is illustrated in FIG. 13. In theory, then classification of data points according to the layout of FIG. 13 should provide an improved way of recognizing A.V.O.s.

A further complication of the above-described situation, and part of the reason that the data does not cluster around the lines of FIG. 13, is associated with wavelet variations as a function of reflection angle. The wavelet variations lead to distortions, which affect the AVO attributes and typically distort the simplified picture, causing a scatter of points around the lines of FIG. 13. The lines as illustrated in FIG. 13 thus become no more than a basic trend for the data points rather than being a line on which the data points sit. The situation is illustrated in FIG. 14, which may be viewed as a more realistic version of FIG. 12. FIG. 14a shows a crossplot of points shown in the wave amplitude mapping of FIG. 14b. It will be noted that in FIG. 14b the Normal Incidence signal is different from the Gradient signal, and this is due to the above-described distortion. When mapping to the crossplot space of FIG. 14a the distortion leads to point scatter around the basic trend line. The extent of the scattering is such that it is difficult to resolve between the different trend lines, and thus recognizable clustering is not seen.

FIG. 15 is a crossplot based on a real data set. It shows an AVO class I anomaly colored pink superimposed on the full data shown in blue. It is clear that the AVO data has a different trend from the total data, that is to say it forms up along a different axis, and in fact the general data trends along the no-oil line whereas the class I anomaly data trends along the class I line. However, be that as it may, the two datasets in the crossplot space of FIG. 15 cannot be separated because they do not form distinct clusters. Without the superimposed color coding, which is to say without prior knowledge, there is no way that the two trends could be spotted from the crossplot.

FIG. 16 is another example taken from the same data set as FIG. 15, but illustrating a Class II AVO anomaly. Again when color coded it is easy to see that the data lines up along two different trend lines, but without prior knowledge there is no way of identifying the trends.

FIG. 17 is a similar display of non-AVO data. Here known non-anomaly data is colored pink whereas general (unclassified) data is left blue. It is clear that the non-AVO data aligns with the general trend of the background data.

During a conventional crossplot procedure, each data point is mapped into a single point on the crossplot space. Consequently, each AVO event, which spans across a number of data points, is mapped to a number of locations in the crossplot space. Hence, theoretical division of the crossplot space to different AVO regions turns out to be unrealistic because there is no one-to-one mapping of crossplot space to AVO signatures.

There is thus a widely recognized need for, and it would be highly advantageous to have an effective way of identifying AVO anomalies, which can be automated, and takes into account both the wavelet shape and the wavelet variations as a function of reflection angle.

SUMMARY OF THE INVENTION

According to one aspect of the present invention there is provided a method of seismic data analysis comprising:

obtaining successive values from a plurality of seismic attributes, each seismic attribute comprising a respective property of a seismic reflection event, grouping the values using a running window of a predetermined length, identifying within each group of attribute values at least two parameters to describe attribute value distribution therein, and plotting said group of values as a single event using said parameters.

Preferably, identifying one of the said parameters comprises finding a trend within said group.

Additionally or alternatively, identifying one of the said parameters comprises finding a maximum within said group.

Additionally or alternatively, identifying said at least two parameters comprises finding a trend within said group for the said attributes and a maximum within said group for the said attributes.

Preferably, said plotting of said parameters comprises plotting said trend against said maximum.

Preferably, a first of said attributes is an amplitude at zero reflection angle.

Preferably, a second of said attributes is a gradient of change in reflection amplitude against reflection angle.

The method may comprise sizing a running window substantially to be the size of an originating wavelet, thereby substantially to group together samples having a corresponding originating wavelet.

The method may comprise reapplying said running window to obtain a next point for plotting.

Preferably, said plotting comprises a first plotting stage for deriving said parameters, said first plotting stage comprising:

plotting said values following grouping of separate points on a crossplot space, after crossplotting a point from one of the said attributes against a point from the second of the said attributes, said crossplot space having an origin, and wherein said identifying said parameter comprises bestfitting a line through said separate points and said origin.

Preferably, said plotting further comprises:

determining a trend and a group amplitude, said trend being an orientation angle of said best fit line and said group amplitude being a length of said best fit line and a second plotting stage of plotting said trend and said group amplitude together as a point in an angle plot space of angle against length, said point thereby representing said group.

The method may comprise dividing said angle plot space into regions representing different classes of AVO anomalies and a region representing no anomaly.

The method may comprise color-coding said groups according to the respective region in said angle plot space in which they fall.

The method may comprise the further stage of applying said color coding from respective points in said angle plot space to corresponding values in a seismic section from which said points originate, thereby to provide a seismic image containing an indication of likely hydrocarbon location.

The method may comprise the further stage of applying said color coding from respective points in said angle plot space to corresponding values in a 3D seismic image from which said points originate, thereby to provide a 3D seismic image containing an indication of likely hydrocarbon location.

Preferably, said windowing is such that each of said groups comprises values received over a time interval, the method further comprising retaining for subsequent hydrocarbon identification only those of said groups having a rate of change of one attribute over time of one sign, and a rate of change of the other of said attributes over time of one predetermined sign.

Preferably, said plotting comprises a first plotting stage for deriving said parameters, said first plotting stage comprising:

plotting said values following grouping of separate points on a crossplot space, after crossplotting a point from one of the said attributes against a point from the second of the said attributes, said crossplot space having an origin, and wherein said identifying said parameter comprises best-fitting a line through said separate points and said origin.

Preferably, said plotting further comprises:

determining a trend and a group amplitude, said trend being an orientation angle of said best fit line and said group amplitude being a length of said best fit line and a second plotting stage of plotting said trend and said group amplitude together as a point in an angle plot space of angle against length, said point thereby representing said group.

The method may comprise dividing said angle plot space into regions representing different classes of AVO anomalies and a region representing no anomaly.

The method may comprise color-coding respective points according to the respective region in which they fall.

The method may comprise a further stage of applying said color coding of said points from said angle plot space to corresponding inputs in a seismic section from which said points originate, thereby to provide a seismic image containing an indication of likely hydrocarbon location.

The method may comprise a further stage of applying said color coding of said points from said angle plot space to corresponding inputs in a 3D seismic image from which said inputs originate, thereby to provide a 3D seismic image containing an indication of likely hydrocarbon location.

According to a second aspect of the present invention there is provided a seismic imaging apparatus comprising:

an input for obtaining successive values from a plurality of seismic attributes, each attribute comprising a respective property of a seismic reflection event, a windower for grouping the values using a running window of a predetermined length, a group parameterizer for identifying within each group of inputs group parameters representative of value distribution within said group, and a plotting unit for plotting said group as a single event using said group parameter.

Preferably, said plotter comprises:

a crossplotter unit for plotting said attribute values per group as points on a crossplot space having an origin, and for best-fitting a line through said points and said origin.

Preferably, said group parameterizer is interactive with said crossplotter unit to identify an orientation angle and a length of said line and to provide said angle and said length to said plotting unit, said plotting unit further comprising an angle plotter to plot said angle and said length together as a point in an angle plot space of angle against length, thereby to plot said group as an individual event.

Preferably, said angle plotter is further operable to divide said angle plot space into regions representing different classes of AVO anomalies and a region representing no anomaly.

The apparatus may be configured to color code said events according to the respective region in which they are plotted by said angle plotter.

The apparatus may be configured to apply said color coding from said events to respective values in a seismic section from which said events originate, thereby to enhance said seismic section by providing an indication of likely hydrocarbon location.

The apparatus may be configured to apply said color coding from said events to respective values in a 3D seismic image from which said values originate, thereby to enhance said 3D seismic image by providing therein an indication of likely hydrocarbon location.

Preferably, each group comprises values received over a time interval, the apparatus being further configured to use only those of said groups having a rate of change of one parameter over time of a first predetermined sign, and a rate of change of a second of said parameters over time of one predetermined sign.

Preferably, said plotter comprises:

a crossplotter for plotting said groups as a series of crossplot points on a crossplot space having an origin, and best-fitting a line through said series of crossplot points and said origin.

Preferably, said group parameterizer is interactive with said crossplotter unit to identify an orientation angle and a length of said line and to provide said angle and said length to said plotting unit, said plotting unit further comprising an angle plotter to plot said angle and said length together as a point in an angle plot space of angle against length, thereby to plot said group as an individual event.

Preferably, said angle plotter is further configured to divide said angle plot space into regions representing different classes of AVO anomalies and a region representing no anomaly.

Preferably, said angle plotter is further configured to apply color coding to angleplot points according to the respective regions in which they fall.

The apparatus may comprise a seismic data analyzer associated with said plotter and wherein said plotter is configured to apply said color coding to respective values in a seismic section from which said angleplot points originate, thereby to confer upon said seismic section an indication of likely hydrocarbon location.

The apparatus may comprise a 3D seismic data analyzer associated with said plotter and wherein said plotter is operable to apply said color coding to respective values in a 3D seismic attribute from which said angleplot points originate, thereby to confer upon said 3D seismic attribute an indication of likely hydrocarbon location.

Preferably, said windower is set to provide a window length to correspond to a typical wavelet duration, thereby to group together in one window successive values originating from a single seismic wavelet.

According to a third aspect of the present invention there is provided a method of seismic data analysis to provide clustering of A.V.O. data into A.V.O. anomaly types, the method comprising:

obtaining successive values of a plurality of seismic attributes, each seismic attribute comprising a respective property of a seismic reflection event, grouping said values using a running window of a predetermined size into a plurality of groups, for each group identifying first and second parameters corresponding to said group, and plotting each group as a single event based on said group parameters, said group parameters having been selected to cause clustering of said seismic reflection events on said plot according to the presence or absence of A.V.O. anomalies.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The file of this patent contains at least one drawings executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a typical seismic section in which the vertical axis represents depth and the horizontal axis represents surface distance, from which geological features are visible.

FIG. 2 is a schematic diagram showing how seismic waves propagate and reflect from the boundary between two layers.

FIG. 3 is a schematic diagram illustrating a vertical section through the ground having a shale layer, a gas sand layer, and another shale layer, and showing amplitude changes with reflection angle alongside for each boundary;

FIG. 4 is a schematic diagram showing three of the four classes of A.V.O. anomaly;

FIG. 5 shows two seismic attribute graphs displaying the amplitude at zero reflection angles (NI), on the left (a) and of gradient on the right (b);

FIG. 6 is a simplified diagram illustrating a crossplot space (right) onto which a point (a,b), representing an NI value of a and a G value of b has been plotted;

FIG. 7 is an idealized version of the crossplot space, indicating how different A.V.O. anomalies theoretically map onto distinct regions;

FIG. 8 is a crossplot of Normal Incidence (NI) versus Gradient (G) created from a 3-D dataset recorded over a large gas field, from which it is apparent that all the data forms a single mass and there is no way of reliably discriminating between AVO and non-AVO effects;

FIG. 9 is a repeat of the crossplot of FIG. 8 onto which the regions of FIG. 7 are superimposed;

FIG. 10 is a double plot of NI on the left a) and G on the right b), showing the actual distribution of points marked pink in FIG. 9 and supposedly belonging to an A.V.O. anomaly;

FIG. 11 shows an attribute only graph a) next to a cross-plot b) and illustrates how the anomaly, marked by a small rectangle on plot 1, maps in crossplot space;

FIGS. 12a and 12b are simplified schematic diagrams showing how the effect of a wavelet on an AVO event (b) maps to a line in crossplot space (a).

FIG. 13 is a simplified schematic diagram of a crossplot illustrating how A.V.O. anomalies of the various classes theoretically map lines at different angles onto a crossplot, when wavelet effects are taken into account;

FIG. 14 is a simplified schematic diagram showing how scatter within the crossplot data points in a) of a wavelet event from b) spoils the theoretical distribution of the anomaly classes and non-anomaly events of FIG. 13.

Figure 1:
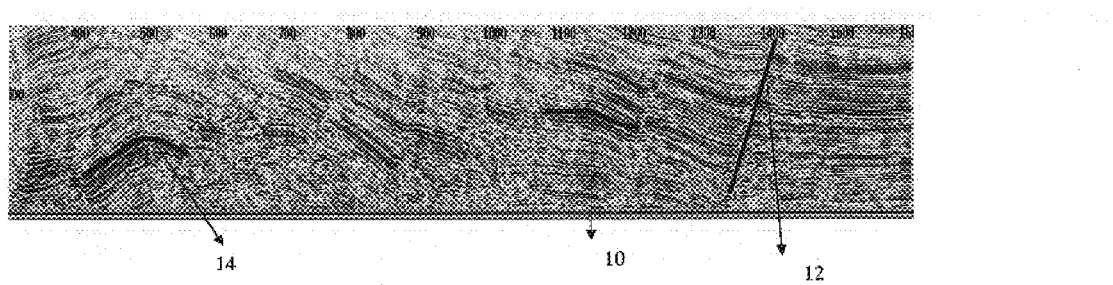
Figure 2:
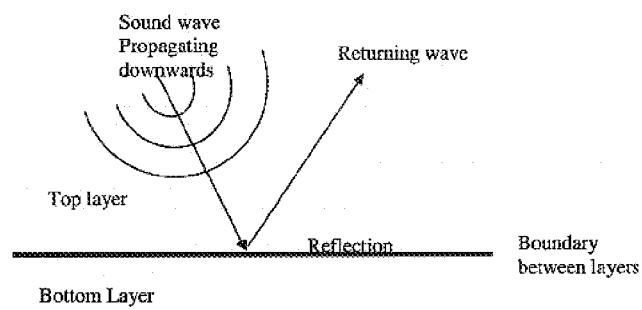
Figure 3:
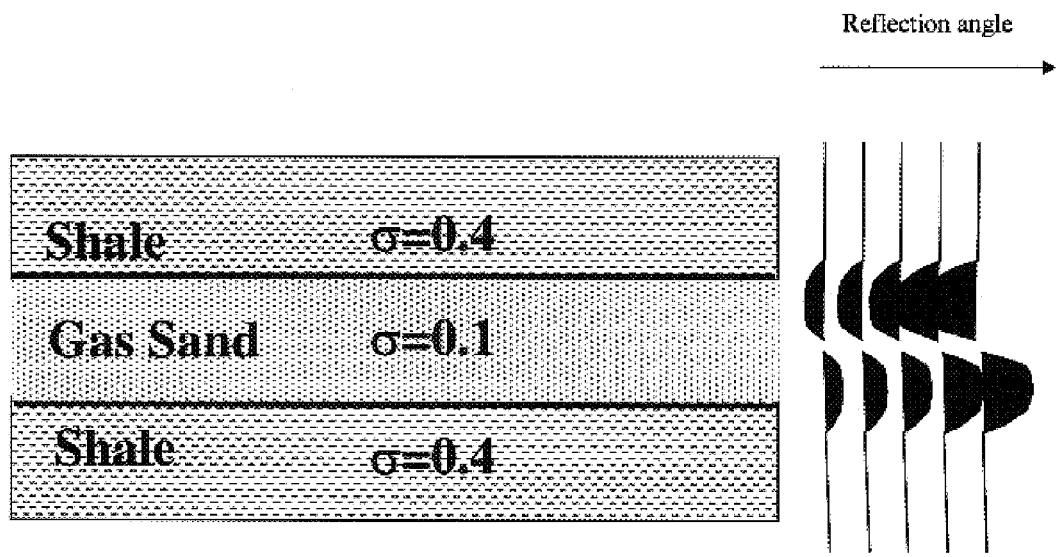
Figure 4:
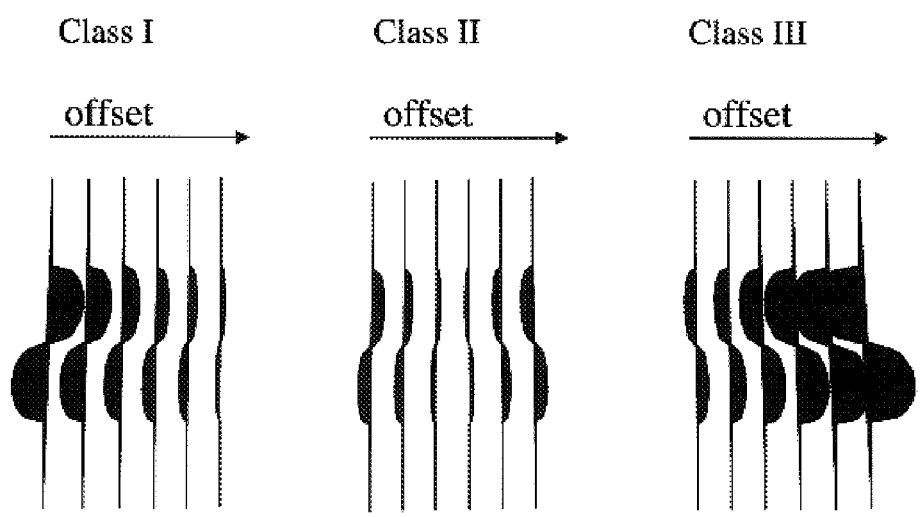
Figures 5A, 5B, 6:
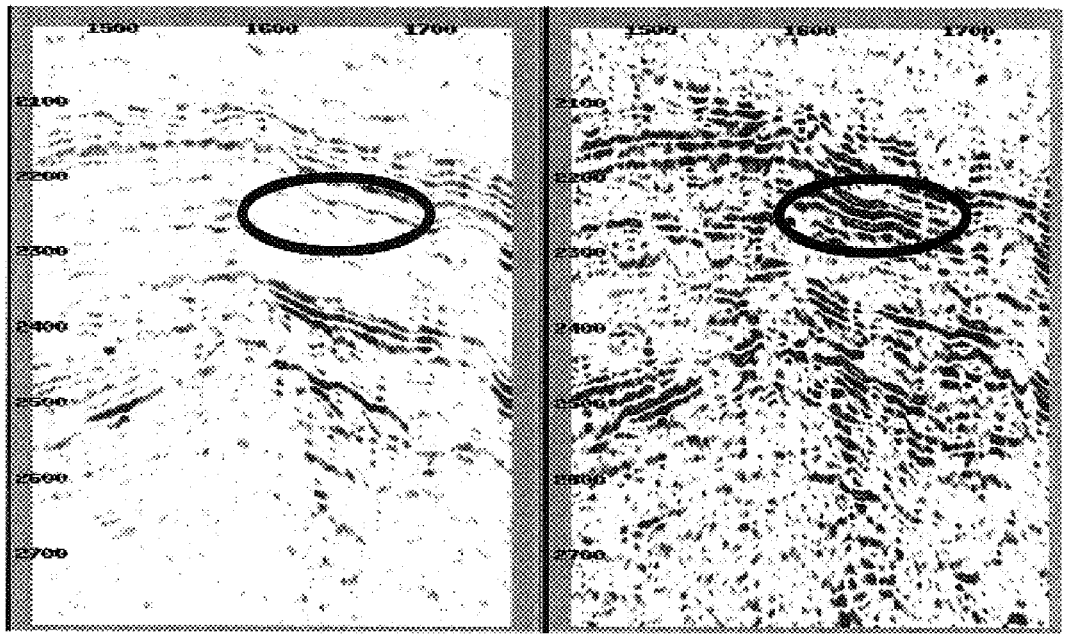
Figure 7:
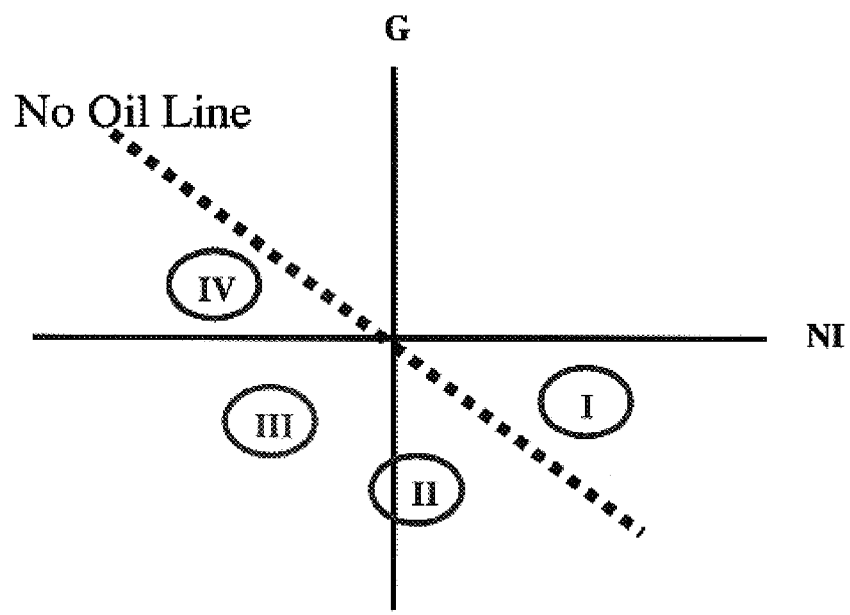
Figure 8:
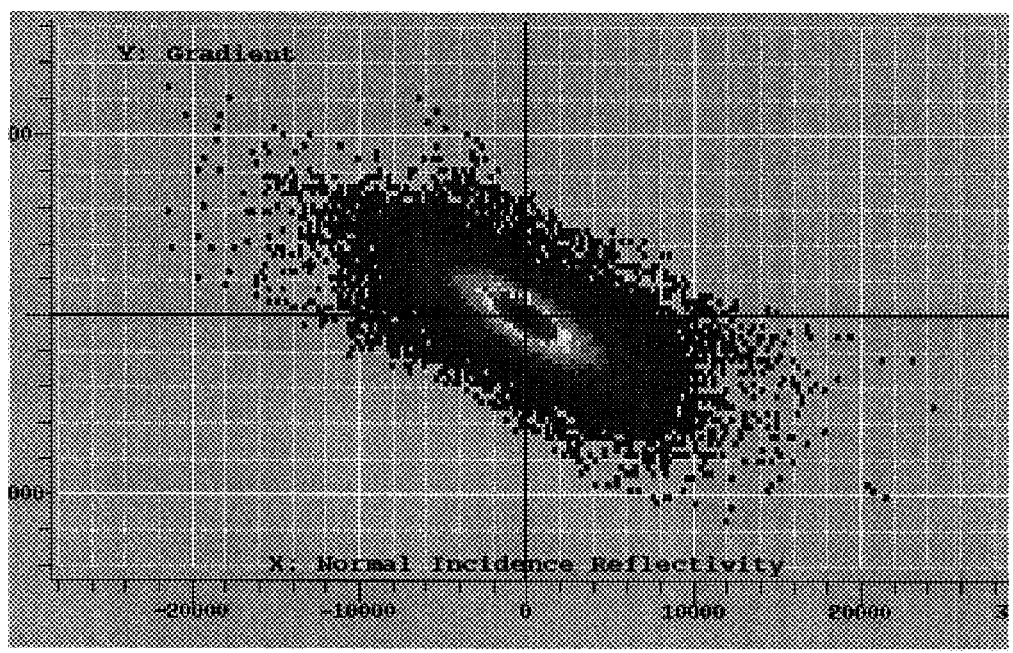
Figure 9:
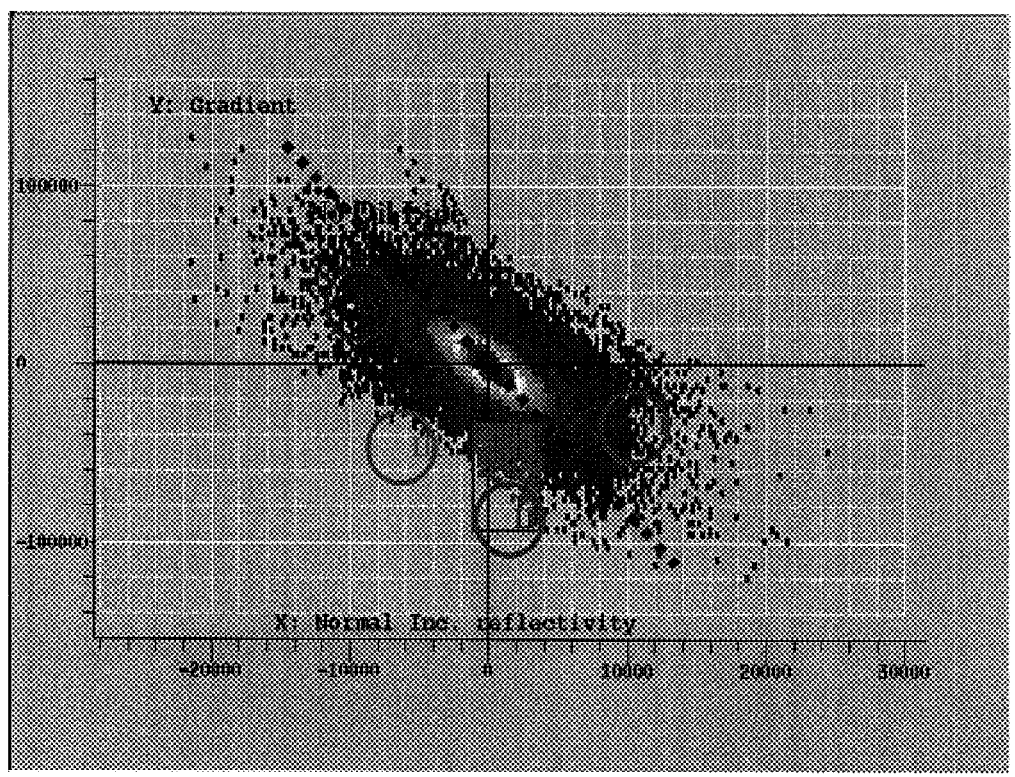
Figures 10A, 10B:
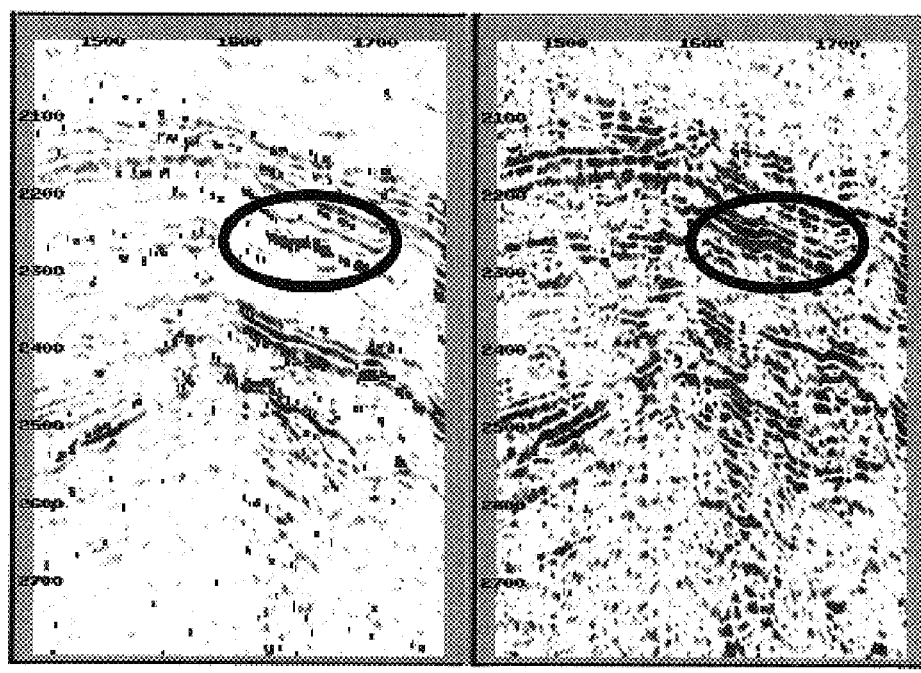
Figure 15:
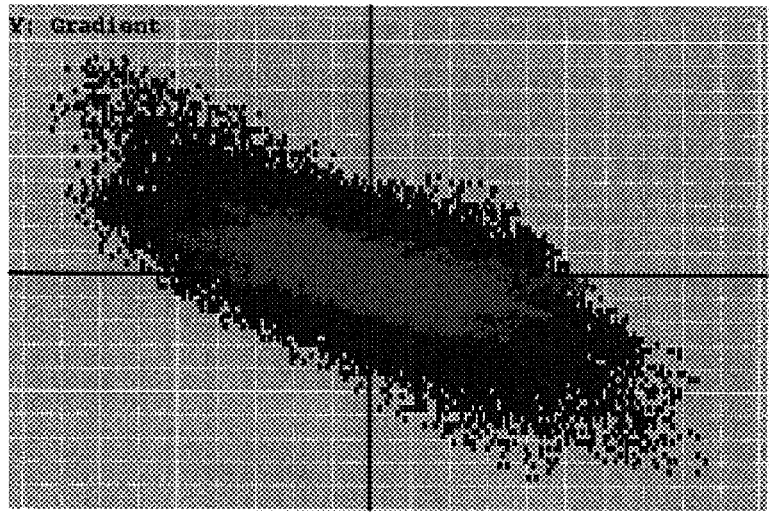
Figure 16:
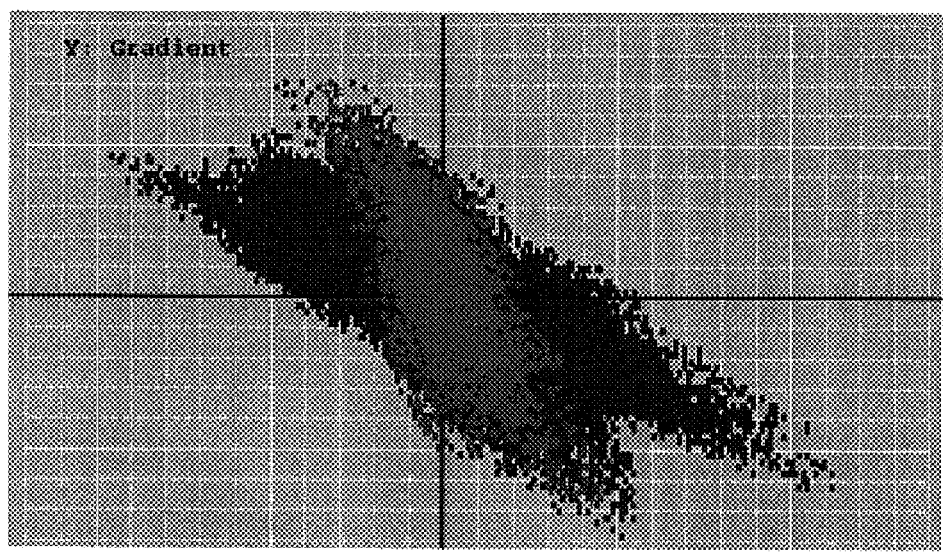
Figure 17:
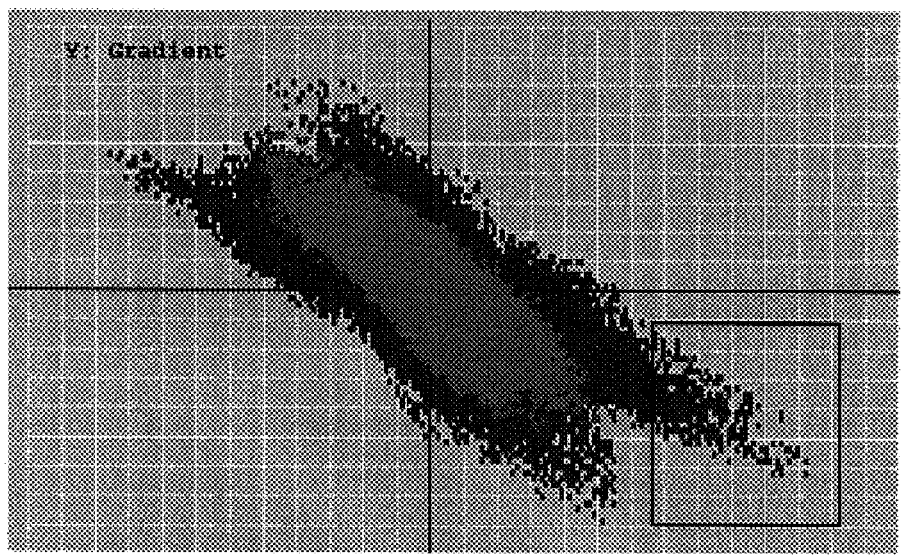

FIG. 15, FIG. 16 and FIG. 17 are crossplots of different events from a single real dataset showing how, despite the scatter of FIG. 14, different types of events, although massed together, have different trend lines. FIG. 15 is of an AVO anomaly class I, FIG. 16 is of an AVO anomaly class II and FIG. 17 is of a non-AVO event.

Figure 18A:
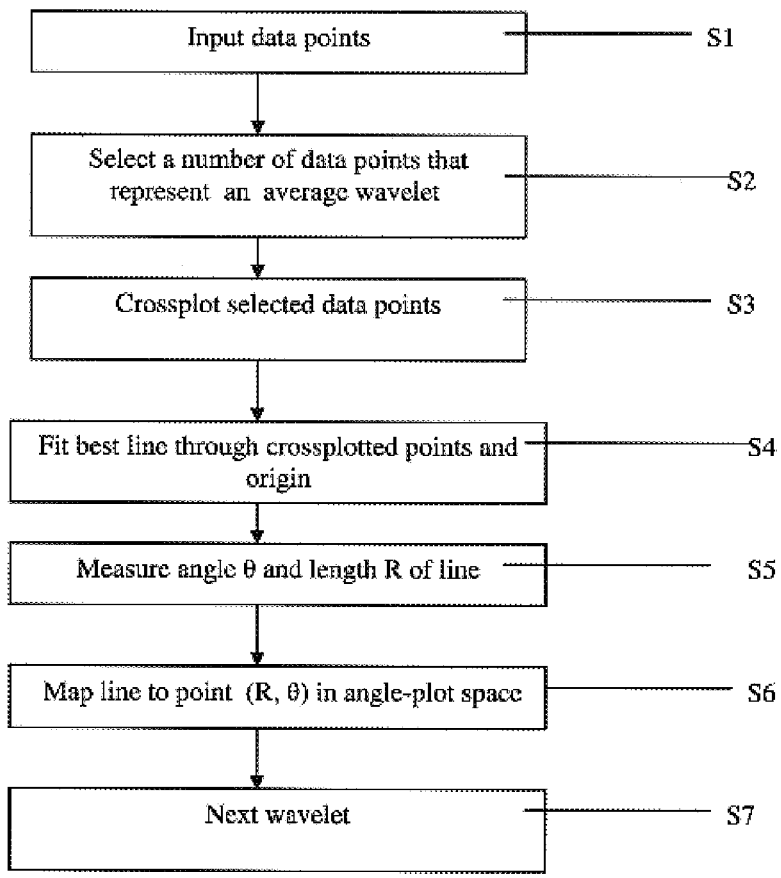
Figure 18B:
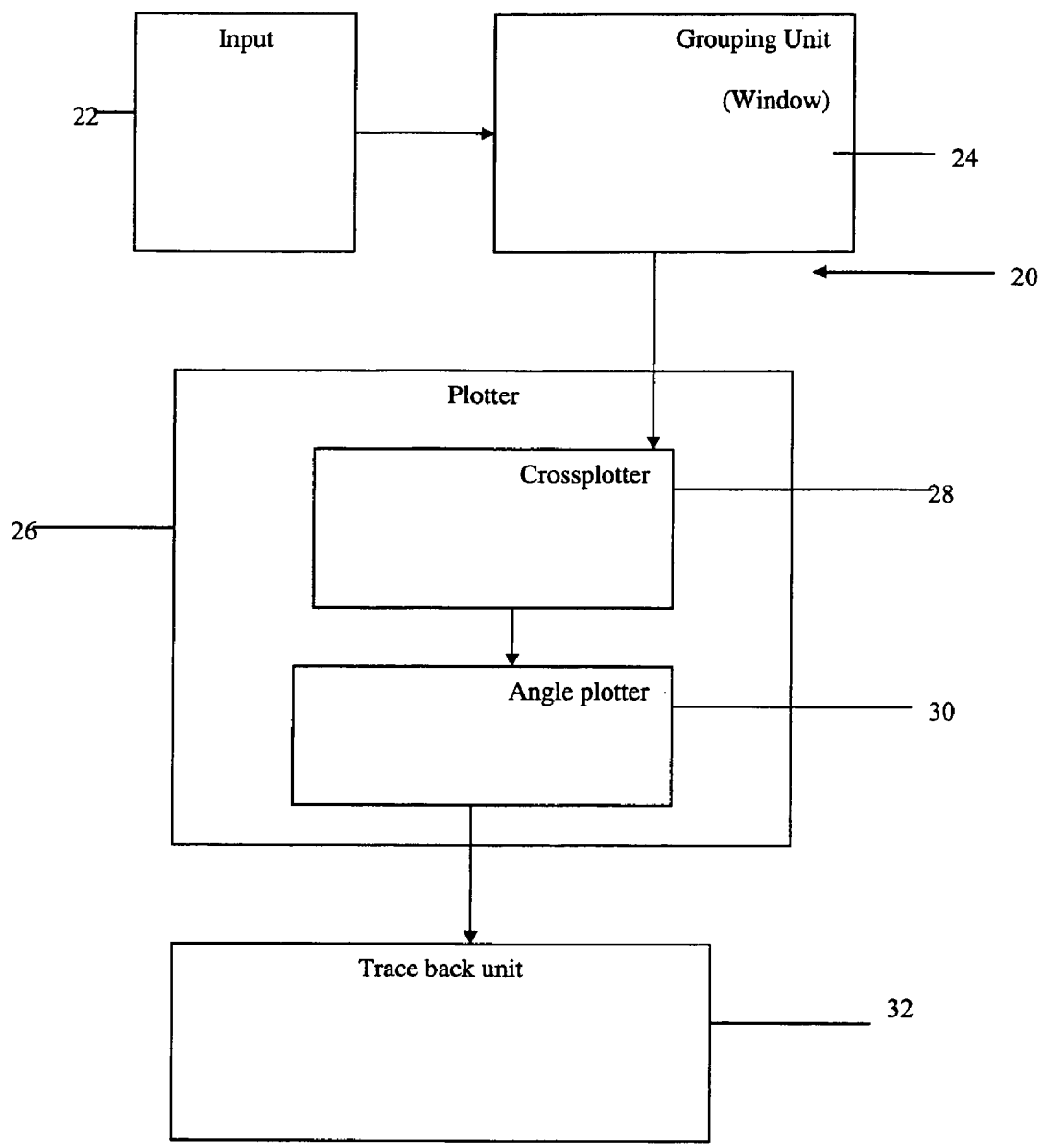
Figure 19:
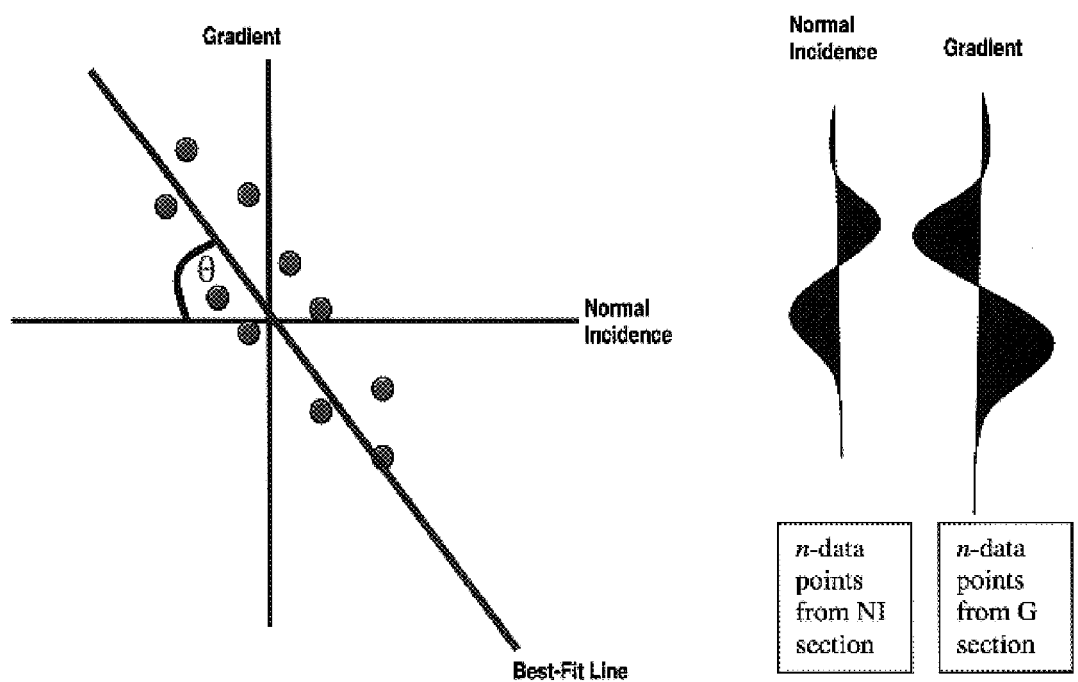
Figure 20:
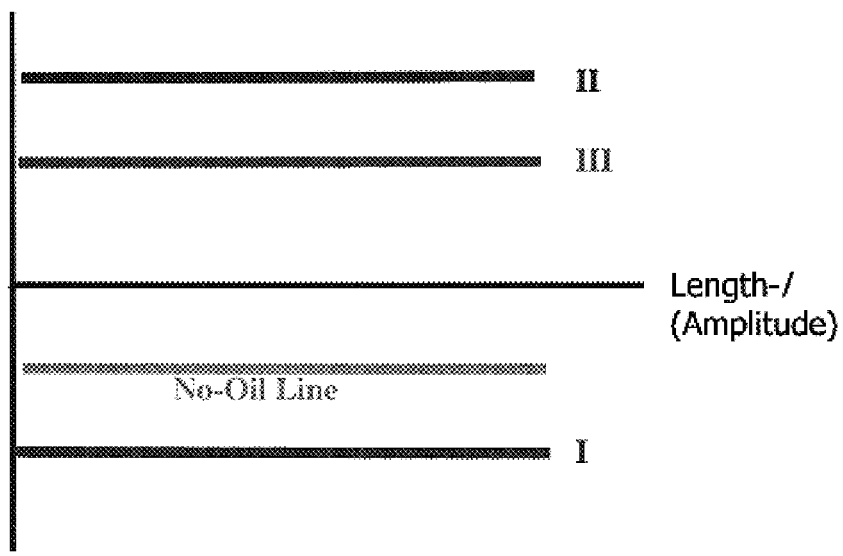
Figure 21A:
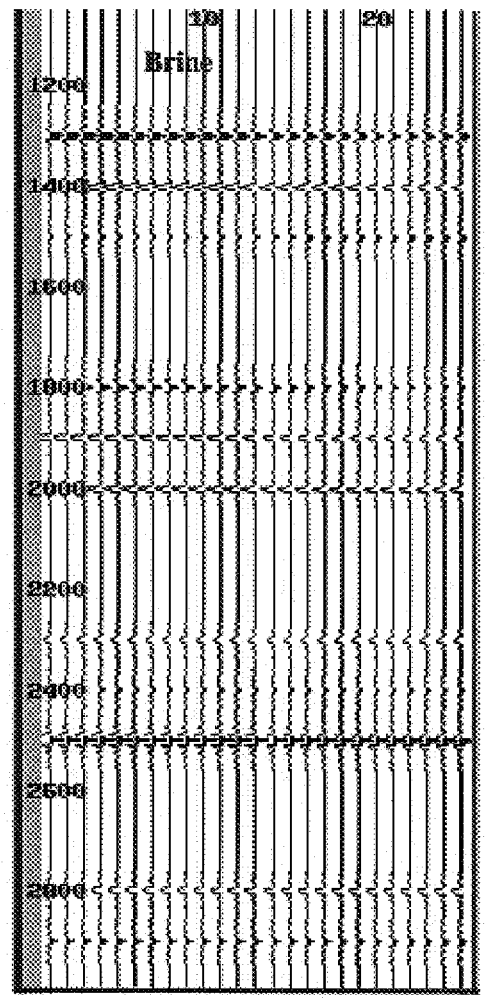
Figure 21B:
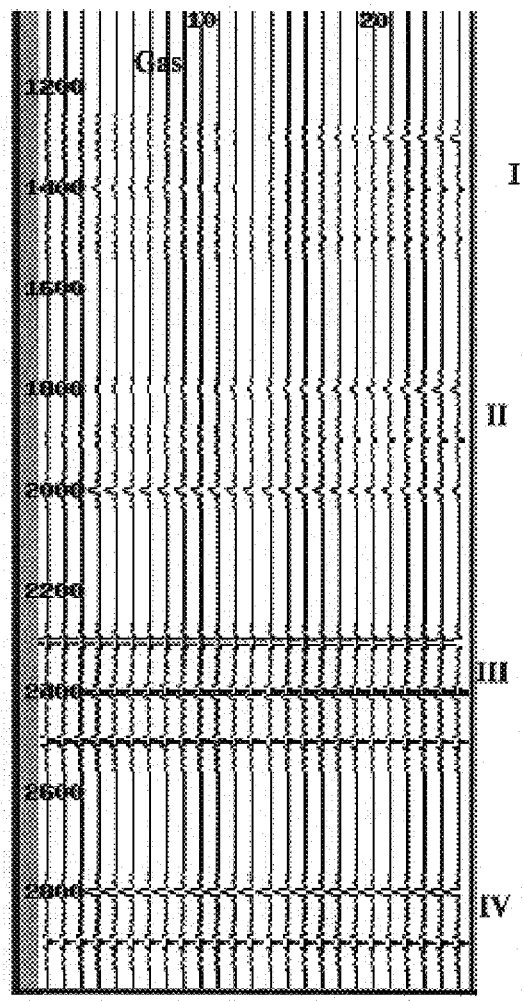
Figure 22A:
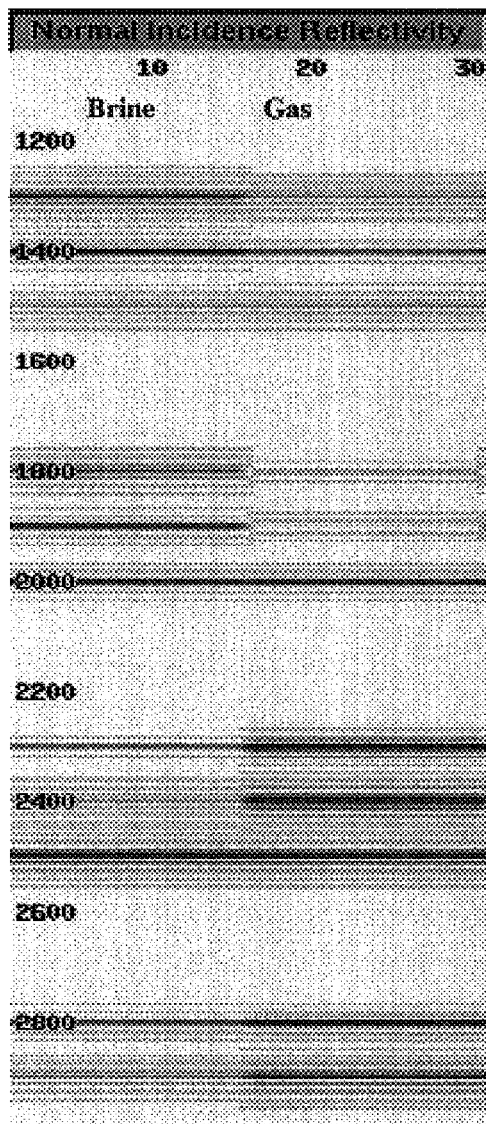
Figure 22B:
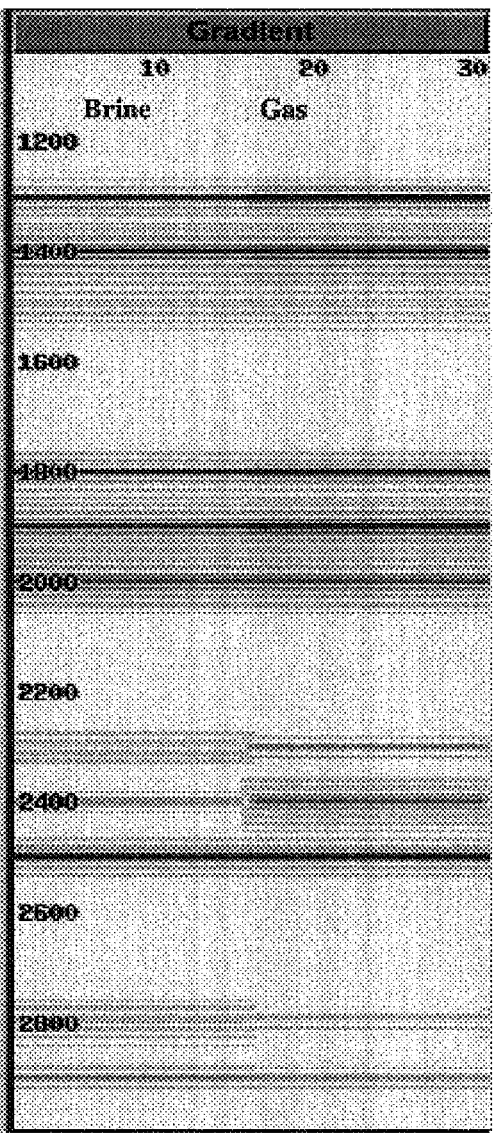
Figure 23:
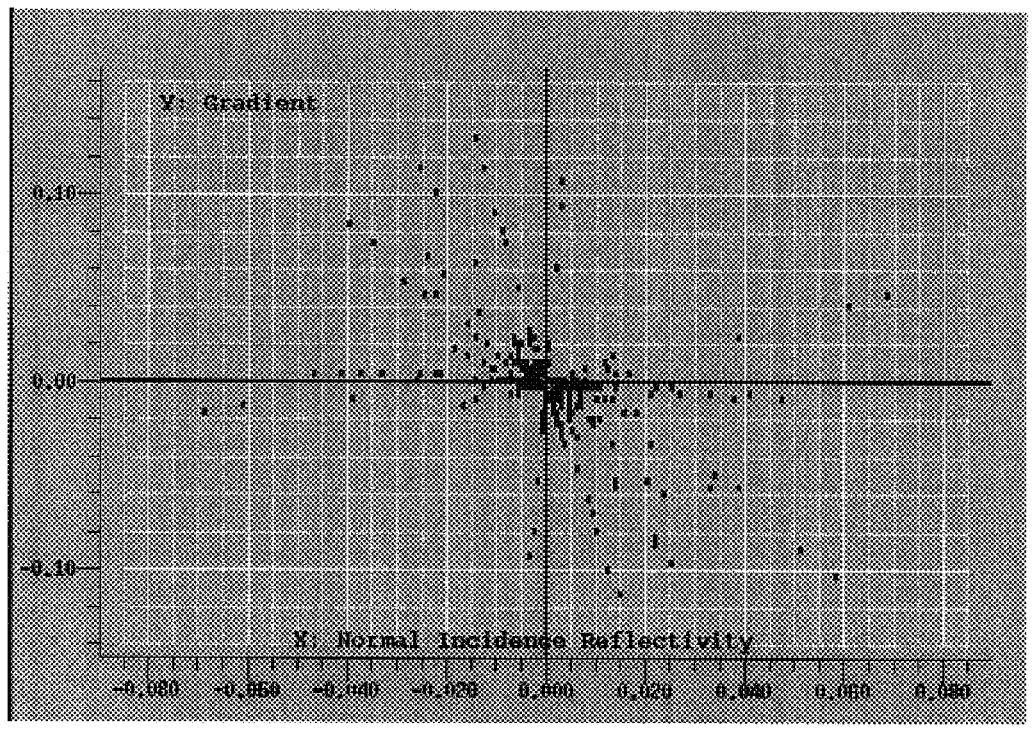
Figure 24:
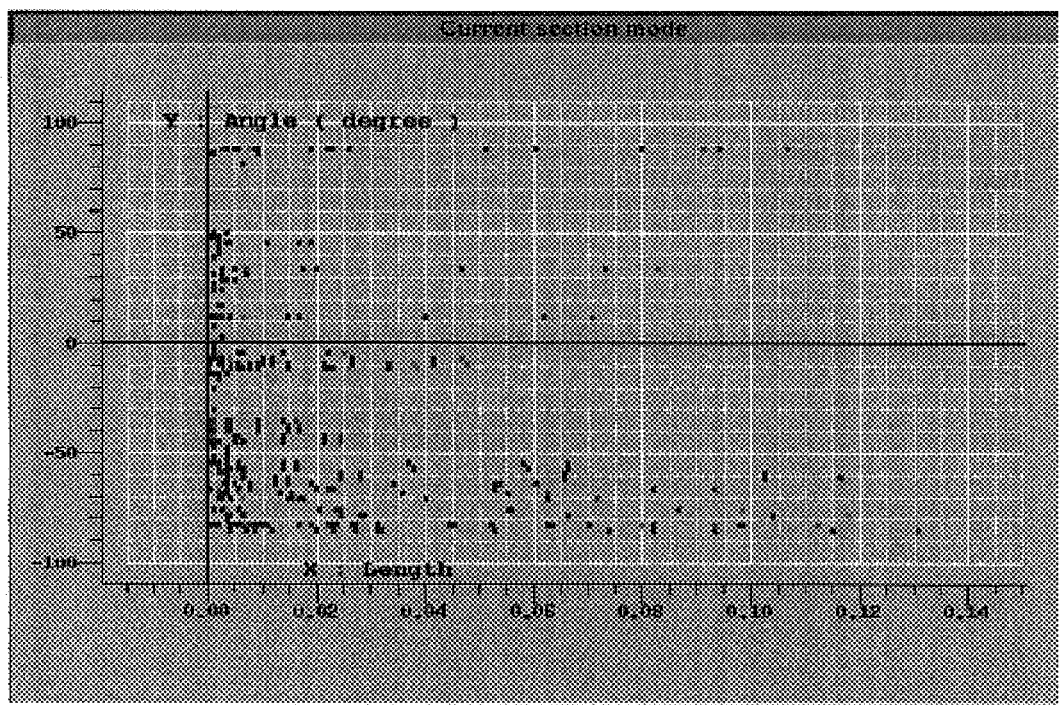
Figure 25:
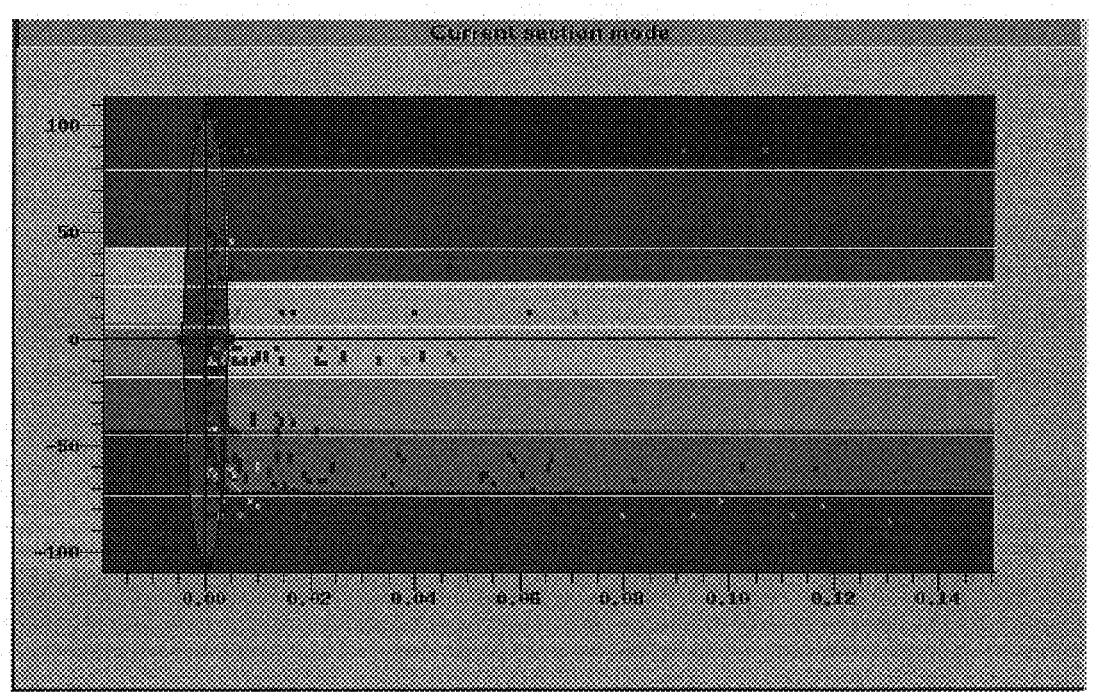
Figure 26:
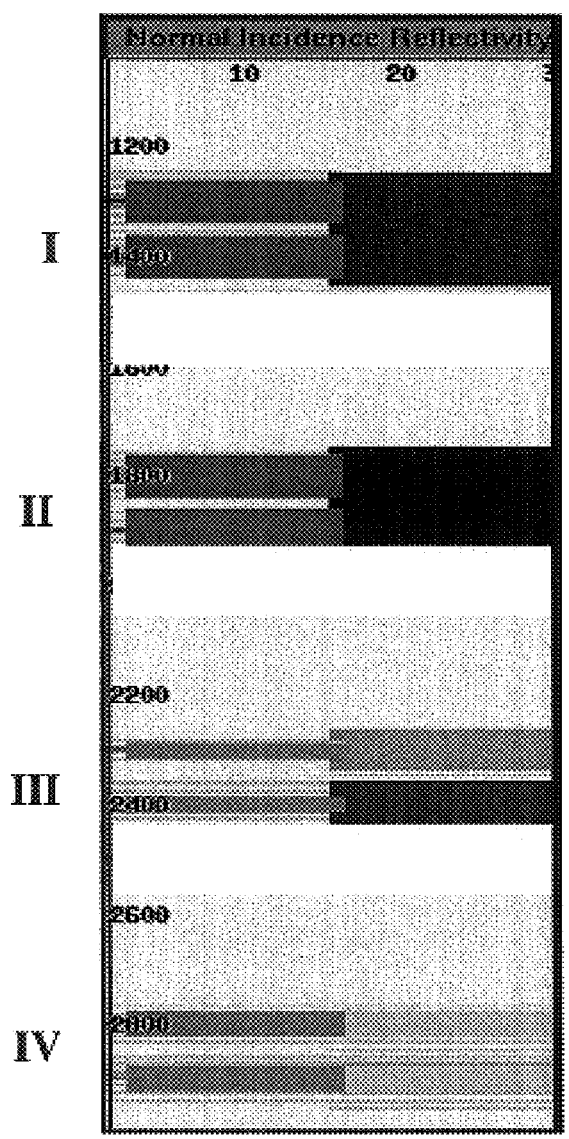
Figure 27:
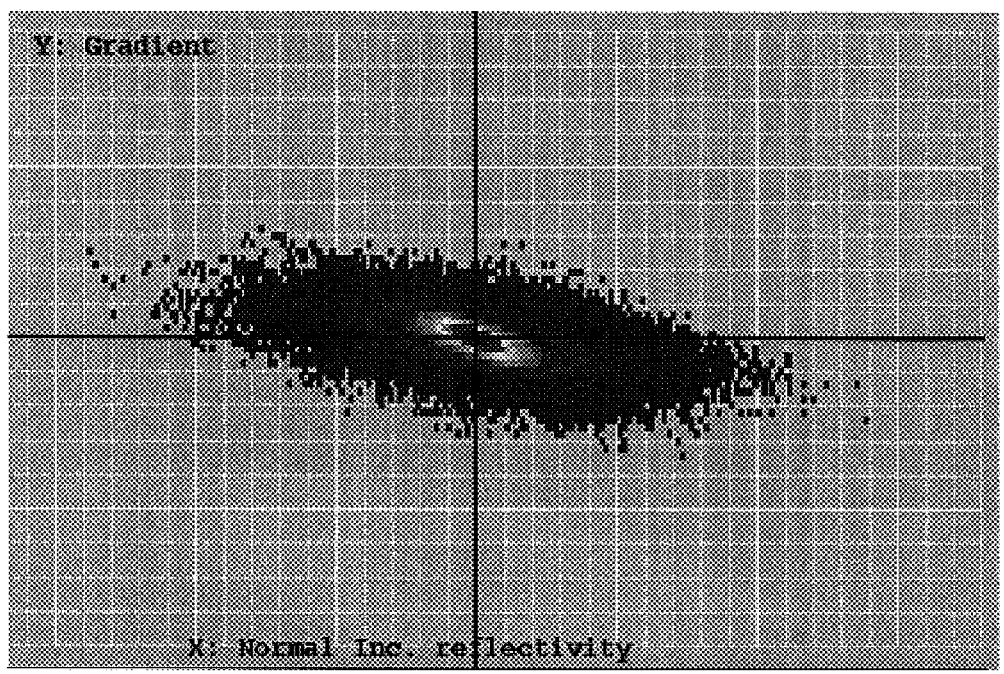
Figure 28A:
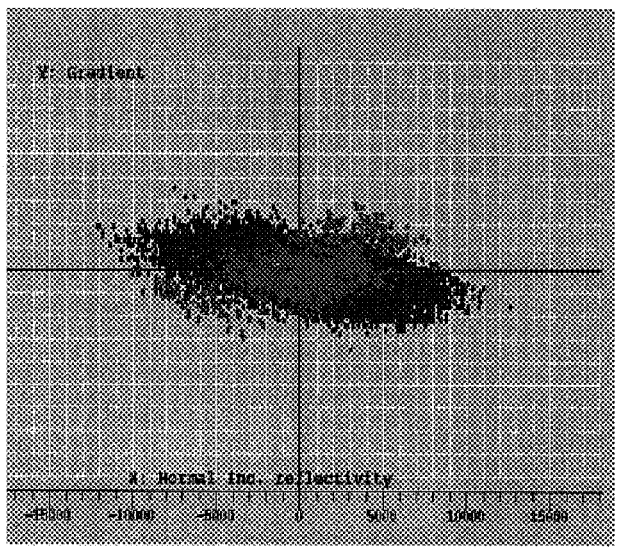
Figure 28B:
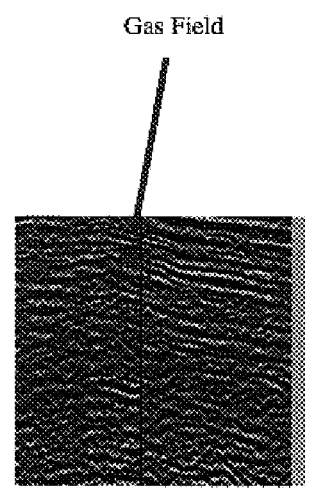

FIG. 18A is a simplified flow chart showing the construction of an angle plot from dual seismic attributes according to a first embodiment of the present invention;

FIG. 18B is a simplified block diagram showing a seismic data analysis device according to a preferred embodiment of the present invention; FIG. 19 is a crossplot diagram showing the procedure described on stage S5 of FIG. 18 for given normal incidence and gradient variations shown alongside;

FIG. 20 is an angleplot diagram illustrating regions on which different A.V.O. anomaly events and no-anomaly events tend to cluster;

FIG. 21 shows two synthetic seismic gathers (traces that change with reflection angle), a) for brine and b) for gas, used in a theoretical example to illustrate the effectiveness of the present embodiments for separating brine from gas;

FIG. 22 shows double plotting, Normal Incidence (22a) and Gradient sections (22b) created from the two datasets of FIG. 21;

FIG. 23 shows crossplotting of the data of FIG. 22;

FIG. 24 shows an angle plot of the data of FIG. 22;

FIG. 25 is the angle plot of FIG. 24 onto which color coding that varies with trend angles has been superimposed;

FIG. 26 is the normal incidence trace of FIG. 22 onto which the color coding obtained from the angle plot of FIG. 25 has been traced back. The trace back clearly identifies all classes of A.V.O. anomalies and separates them from the brine data;

FIG. 27 is a crossplot showing an actual 3-D dataset of a seismic survey, the survey containing a gas reservoir with a class II AVO anomaly, the dataset being used in a practical example to illustrate use of the present embodiments;

FIG. 28 is a conventional crossplot a) constructed from seismic section b). Data corresponding to an actual anomaly is colored pink in both a) and b) and the failure of the anomaly data to cluster in a) is clearly seen.

Figure 29A:
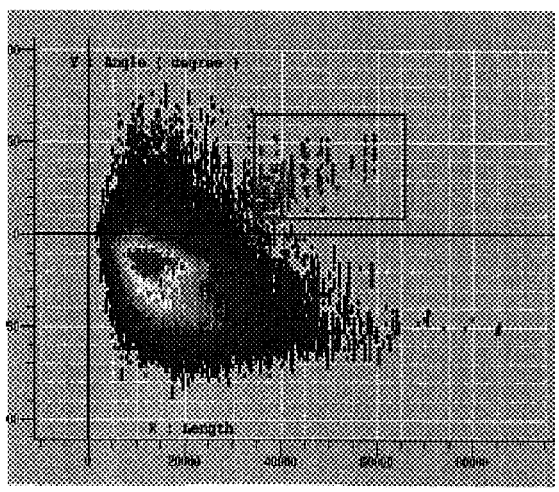
Figure 29B:
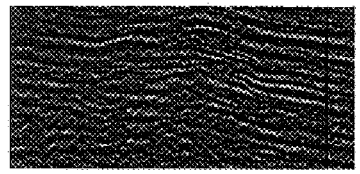
Figure 30:
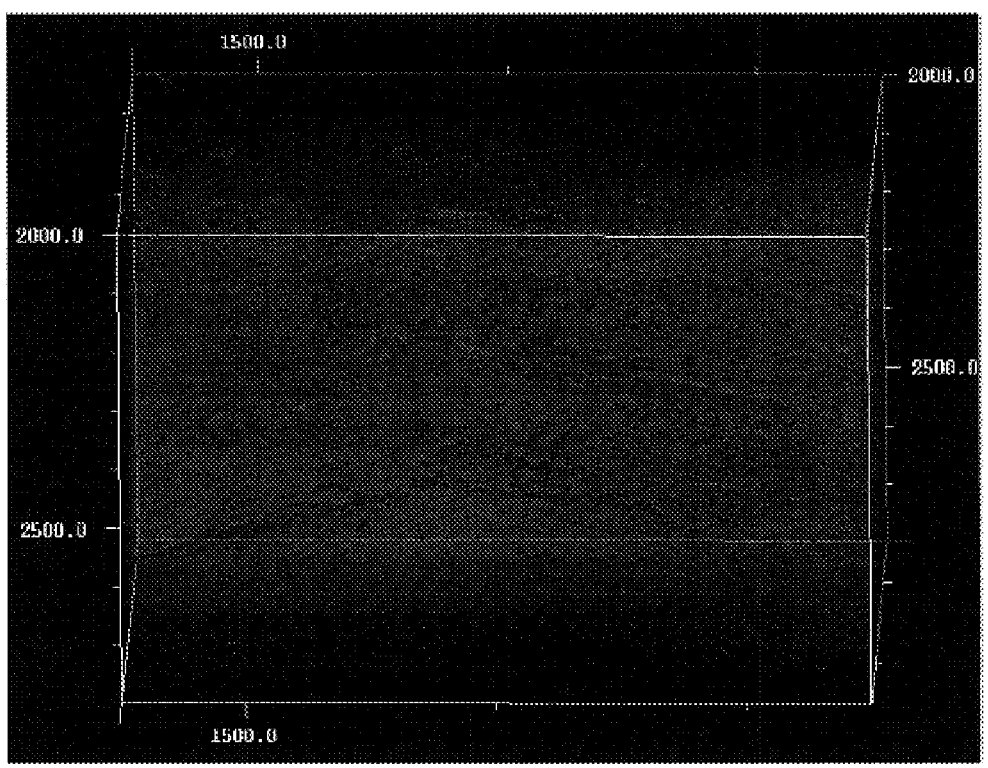
Figure 31:
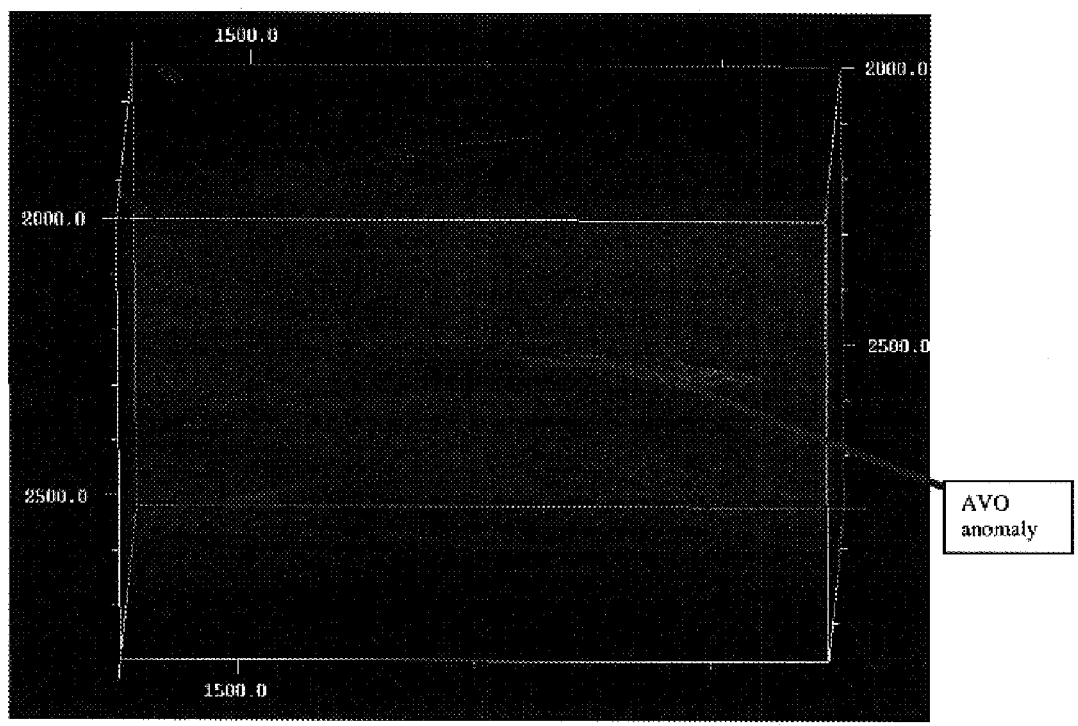

FIG. 29 is an angle plot a) of the data in FIG. 28, showing clear clustering of the AVO anomaly data (marked pink) to the top right hand side of the plot, b) showing the colored data traced back to the seismic section;

FIG. 30 shows a 3D seismic survey over which apparent anomaly data determined from conventional cross plot is colored blue;

FIG. 31 shows the same 3D survey as FIG. 30, except that the cross plot data was subjected to subsequent angle plotting, in accordance with a preferred embodiment of the present invention. The location of the gas reservoir is clearly recognizable in the survey;

FIG. 32 is a schematic cross plot a) shown against amplitude b) to show how two different AVO events cannot be distinguished on an angle plot;

FIG. 33 shows a seismic survey onto which anomalies determined from an angle plot have been traced back by coloring, without constraining the data prior to angle plotting; and FIG. 34 shows the seismic survey of FIG. 33 onto which the trace back is made from angle plotting of constrained data, thereby to distinguish between AVO anomaly and non-AVO anomaly events.

DESCRIPTION OF THE PREFERRED EMBODIMENTS

The present embodiments provide a method and apparatus for analyzing the incoming data per wavelet. Each wavelet rather than each data point is treated as a single event. Note that a wavelet here corresponds to a fixed number of data samples that encompass the length of a typical wavelet in the dataset. The data points of the wavelet are plotted in crossplot space and a best fit line is fitted to the data of the individual wavelet. The angle and length of the best fit line are then plotted in angle-plot space, where the plots are found to cluster into the respective A.V.O. anomaly classes and non-anomaly data. The double plotting procedure as described above is referred to hereinbelow as the crossplot—angleplot procedure.

The use of the crossplot—angleplot procedure as described above on seismic imaging data according to the embodiments of the present invention allows for separation, that is clustering of A.V.O. anomaly data from non-A.V.O. anomaly data in crossplot space. Effective separation of A.V.O. anomalies from the rest of the data enables direct detection of hydrocarbons in large seismic datasets.

The principles and operation of seismic imaging apparatus according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 18A is a simplified flow chart showing a crossplot—angleplot procedure according to a first preferred embodiment of the present invention.

Use of the crossplot—angleplot procedure allows for consideration to be applied to each wavelet as a unit. Crossplot angleplots, that is angle plots derived from crossplots are preferably generated according to the procedure illustrated in FIG. 18A. First of all input data is received in a stage S1. Then the first seismic trace is selected at S2. Then, the first n data points from the trace, which correspond to an average wavelet length, in the manner mentioned above, are selected in a stage S3. The samples are then placed on a crossplot in a stage S4. Reference is now made to FIG. 19, which shows a cross plot of points from a single wavelet, against an amplitude diagram of the NI and G data. A cross plot of the kind shown in FIG. 19 may be expected as the result of stage S4 and gives a plot for each sample in the wavelet of one sample attribute against the other. Returning to FIG. 18, and in the following two stages a derivation is made of group parameters which represent group behavior of theattribute values plotted in the crossplot. In stage S5 a best fit line is drawn through the points and through the origin (0,0). Such a best-fit line is shown superimposed on the crossplot of FIG. 19.

In a stage S6, a measurement is made of two parameters of the best fit line: the angle ($\theta$) and the length of the line (R). The length R is proportional to the maximum NI amplitude along the given wavelet, and is therefore a measure of amplitude of the wavelet. The angle ($\theta$) is an overall trend of the individual angles of the samples. The n-sample one-wavelet event is now mapped, in a stage S7, to a single point (R $\theta$) in angle-plot space. Angle plot space is a two-dimensional domain formed by using length as one axis and angle as the second axis. The plot is of the point (R, $\theta$), that is to say the parameters extracted from the line are the coordinates of the angle-plot space. The next (R, $\theta$) point is generated by selecting the points representing the next wavelet and repeating the process. Selecting points that correspond to a wavelet is generally carried out by windowing successive samples using an n-sample window where n is the average number of samples that correspond to a single wavelet. A next sample is then obtained by sliding the window n samples further along.

The sample attributes of NI and gradient, and the corresponding group parameters are selected because of compatibility with existing equipment and software, and because they provide effective clustering. However, other attributes indicative of seismic reflection may also be used and corresponding group attributes be derived.

The crossplot—angleplot procedure is helpful because it maps different classes of AVO anomalies into distinct places in the angle plot space. Use of the best fit line allows for scatter to be averaged out and therefore the data events are able to cluster. Reference is now made to FIG. 20 which shows the angle plot space, in which the vertical axis represents angle, and the horizontal axis represents length. FIG. 20 traces out lines on which class I, II, & III anomalies tend to cluster. FIG. 20 also shows the no-oil line where non-hydrocarbon bearing points tend to cluster. The angle plot space thus enables the separation or clustering of AVO anomalies into different classes and distinguishes them from the no-oil data. Clustering on the angle plot space allows for clear separation of AVO anomalies from the rest of the data. It is pointed out that no separate line is traced for a class IV anomaly. This is because the lines for Class I and Class IV in fact coincide. Indeed, straightforward use of the angle plot crossplot does not allow for the separation of Class IV from Class I. However, as will be explained in greater detail below, a preprocessing stage of constraining the input data can allow for separation between Class I and class IV.

As mentioned above, the best fit line in effect overcomes data scatter effects. It is noted that, by fitting a line in the above-described manner, a more stable and robust A.V.O. analysis is created. The procedure overcomes many of the problems associated with wavelet distortions. In addition the procedure only has a very small sensitivity to n, the selected number of samples that represent a typical wavelet. This is because a small number of data points can quite effectively represent the AVO trend in the crossplot space. The effect of the processing window is reduced even more when constraining the angle-plot calculations as explained below.

Reference is now made to FIG. 18B, which is a simplified block diagram illustrating a device for carrying out seismic imaging according to a preferred embodiment of the present invention. Device 20 comprises an input 22 for receiving data. The data received is, as described above, seismic data describing amplitude variation with reflection angle for each location. The data thus comprises a series of values, or a trace, for each of two attributes of seismic reflection events. The data is windowed by grouping unit 24, which is connected subsequently to the input 22. The grouping unit 24 preferably windows the data to let in the number of samples that typically corresponds to a wavelet. The windowed data is passed on to a plotter 26. The plotter 26 comprises two parts, the first of which is a crossplotter 28 which forms the cross plot, fits a best fit line and then determines the length and angle of the best fit line for each wavelet event, as described above. Subsequent to the cross plotter is an angle plotter 30, which plots the angle against the length as a single point for each event onto the cross plot space. The length and angle of the best fit line thus serve as parameters representing value distribution for each of the attributes over the group, and thus allow the entire group to be represented by just two co-ordinates—a single point. A color is assigned to the data point depending on where it appears in the angle plot space, and the color is applied, via trace back unit 32, to the original seismic section, so that the location of anomalies can be determined.

The crossplot—angleplot procedure is further explained by means of the following non-limiting examples:

A Synthetic Example:

Reference is now made to FIG. 21, which shows seismic traces of synthetic seismic data on which the crossplot—angleplot procedure was practiced. FIG. 21 shows two different seismic data sets which were computer generated, one for brine filled sand/shale contact, that is a set of "no-oil" data, and the other for gas sand/shale contact. Each of the data set therefore contains different clustering. Between the two datasets there are four events representing AVO anomalies of classes I, II, III, and IV (top to bottom respectively in the figure). Elastic parameters for the AVO data were taken from Barnola and White, 2001. The objective of the example is to show that when using the crossplot—angleplot procedure it is possible to identify all classes of AVO anomalies and separate them from the no-oil data. The two datasets displayed in FIG. 21 are seismic traces as a function of reflection angle. The AVO signature indicates how the amplitude changes as a function of the reflection angle.

The brine data is presented in FIG. 21a and the gas data is presented in FIG. 21b. Reference is now made to FIG. 22, which presents Normal Incidence (22a) and Gradient sections (22b) created from these two datasets. Conventional NI-G crossplotting of the data is shown in FIG. 23. Study of FIG. 23 in fact shows recognizable clustering of the data around different trend lines in the crossplot space. However it must be borne in mind that the clustering can only be seen because the synthetic data is highly idealized and is of limited size which does not compare to the data sets of a realistic survey, and in practice distortions, noise and super position and many data points would distort this idealized situation so district trend lines would not be recognized. An angle-plot of the same data is presented in FIG. 24, to which reference is now made. The vertical axis is the angle axis ($\theta$) and the horizontal axis is the length (R). As discussed above, the length is proportional to the maximum amplitude of the event. Apart from clustering around the Y axis, it can be seen that the data points are organized along horizontal lines whose heights are defined by the angle associated with the event. The data clustered around the Y axis is small amplitude data and generally indicates noise. Such data is preferably ignored by the subsequent analysis.

Color-coding techniques are often used in conjunction with classification of seismic data, as here into different classes of AVO anomalies. Reference is now made to FIG. 25, which is a simplified diagram showing an angleplot space wherein the clustering regions are color-coded. The data is that of FIG. 23, but the space is color-coded in stripes along the angle axis. The objective of the coloring is to color-map the AVO data according to the different data types. The small amplitude area is not colored, as it is mostly noise or insignificant data. Colors are applied to the data events according to the positions in which they are mapped on the angleplot and then are applied back to the originating data points on the attribute data.

Reference is now made to FIG. 26, which is a simplified diagram showing the seismic trace of FIG. 22 to which color-coding from FIG. 25 has been applied following angleplotting of the data. That is to say color-coding from the angle plot is traced back onto the data points as they originate from the seismic sections, to allow any anomalies found to be associated with actual locations.

Mapping of the points to the attribute data after color-coding, as shown in FIG. 26, provides exact color-coded classification of the data according to distinct A.V.O. classes. It is noted that in FIG. 26, all events in the brine part of the section map to green, which is consistent with brine saturation angle ranges and corresponds to the no-oil region. The gas sands are mapped onto four colors according to the four A.V.O. classes. Note that in this idealized case anomalies of Class I and Class IV are nicely separated. In practice this separation is normally not achieved, although see the constrained data embodiment below. Generally Class I and Class IV anomalies are less distinctive because they are very close to the Mud-Rock region.

A Field Data Example:

FIG. 27 is a crossplot showing a 3-D dataset which in fact contains a gas reservoir with a class II AVO anomaly. The field data example illustrates that once again, when using field data from a large survey, the situation is more difficult to deal with than the theory suggests. Nevertheless, clearly recognizable clustering occurs.

In the crossplot of FIG. 27, identification of the anomaly is not possible since all the data is concentrated together. FIG. 28 shows a crossplot in a) of data taken from a seismic section b). In both parts of the figure, that is, in both the seismic section and in the crossplot, data that originates from the gas reservoir is marked in pink. FIG. 28a) shows superposition of the gas field data, an AVO event, over the rest of the crossplot data. It is apparent that the gas field data has a different trend in the crossplot space. However, as in all of the previous cases, the data is intermixed with the remaining non-hydrocarbon indicating data, so that distinguishing therebetween is impossible.

Reference is now made to FIG. 29, which presents the angle plot that corresponds to the same data. The class II AVO anomaly is marked in pink and is enclosed in a rectangle. The anomaly data has clustered at the upper right hand side of the picture, away from the main mass of data.

Thus the anomaly data is clearly distinct from the remaining data. It is clear that the AVO anomaly events are clearly separated in the angle plot space.

Reference is now made to FIGS. 30 and 31, which are seismic scans on which are displayed the same results in 3-D. Firstly, FIG. 30 shows detection of class II AVO anomalies using a conventional crossplot. Note the large scatter of detected points. Most of the detected points are artifacts, that is products of the detection process itself rather than genuine detections of hydrocarbons. In FIG. 31 the same data is detected using the crossplot—angleplot procedure of the present embodiments and clearly and distinctly shows class III AVO anomalies. The points showing the anomaly are indicated in blue. FIG. 31 clearly delineates the reservoir zone from the rest of the data.

Constraining Angle Crossplot According to the AVO Anomaly Type:

Angle plotting of NI against G can be used to provide additional information. It is possible to monitor the order, or time of receipt, of the different samples that are grouped together as being part of the same wavelet and determine whether the various sample values increase with time (or depth) or decrease therewith. In other words, it is possible to determine if the signal is positive and then negative, or the reverse, negative and then positive. Reference is now made to FIG. 32 which shows in a) a conventional crossplot taken for a set of points from a single wavelet. It is possible to constrain the data for example, by using only points where the signal is first positive and then negative. Such can help to differentiate between the two cases displayed in FIG. 32b) which shows two cases of input groups, namely NI positive—gradient negative, the top case, and NI negative—gradient positive the bottom case. The top case and the bottom case map in the angle plot space to the same line, and therefore the angle plot fails to differentiate between them. By constraining the calculations it is possible to select the top case or the bottom case as desired. Once selected, the respective points may then be viewed separately, or colored separately and then viewed together. The ability to constrain the data between the two cases is useful because it makes it possible, inter alia, to distinguish between class I and class IV AVO anomalies, which as noted above are difficult to discern from a standard unconstrained angle plot.

The ability to constrain further permits use of the angle-plot construction to detect specific events. Reference is now made to FIG. 33, in which color-coding from angle-plotting is used to highlight an AVO anomaly, shown in green, that exhibits reverse polarity. By constraining the calculation of the angle plot to $dNI/dt>0$ and $dG/dt<0$ where t is time, (or the order of the samples on the seismic trace) it is possible to improve angle plot classification. In FIG. 33, however, no such constraint has been applied. Reference is now made to FIG. 34 which shows the results of applying the above constraint to the same data. It is clear that the AVO event shown in green is better defined and the location of the gas field is clearer.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of seismic data analysis comprising:
   obtaining, for each surface location in a collection of seismic data, successive values from a plurality of seismic attributes data sets, each seismic attribute data set comprising a respective property of said collection of seismic data,
   grouping the values using a running window of a predetermined length,
   calculating from each group of attribute values at least two parameters representing group behavior of said attribute values within said window, and
   plotting each of said groups of values as a single point, in a space defined by said parameters.

2. The method of claim 1, wherein calculating one of the said parameters comprises finding a trend within said group.

3. The method of claim 1, wherein calculating one of the said parameters comprises finding a maximum within said group.

4. The method of claim 1, wherein calculating said at least two parameters comprises finding a trend within said group for the said attributes and a maximum within said group for the said attributes.

5. The method of claim 4, wherein said plotting of said parameters comprises plotting said trend against said maximum in said space defined by said parameters.

6. The method of claim 1, wherein a first of said attributes is an amplitude at zero reflection angle.

7. The method of claim 6, wherein a second of said attributes is a gradient of change in reflection amplitude against reflection angle.

8. The method of claim 1, comprising sizing a running window substantially to be the size of an originating wavelet, thereby substantially to group together samples having a corresponding originating wavelet.

9. The method of claim 8, further comprising reapplying said running window to obtain a next point for plotting.

10. The method of claim 1, wherein said calculating is performed, for a group, in a first plotting stage, said first plotting stage comprising:
    plotting said values following groupings, as points on a crossplot space, by crossplotting each point from one of the said attributes against a corresponding point from the second of the said attributes, said crossplot space having an origin, and
    best-fitting a line through said separate points and said origin.

11. The method of claim 10, wherein said plotting, for a group, further comprises:
    determining a trend and a group amplitude, said trend being an orientation angle of said best fit line and said group amplitude being a length of said best fit line and
    a second plotting stage of plotting said trend and said group amplitude together as a point in an angle plot space of angle against length, said point thereby representing said group.

12. The method of claim 11, further comprising dividing said angle plot space into regions representing different classes of AVO anomalies and a region representing no anomaly.

13. The method of claim 12, further comprising color-coding said groups according to the respective region in said angle plot space in which they fall.

14. The method of claim 13, comprising the further stage of applying said color coding from respective points in said angle plot space to corresponding values in a seismic section from which said points originate, thereby to provide a seismic image containing an indication of likely hydrocarbon location.

15. The method of claim 13, comprising the further stage of applying said color coding from respective points in said angle plot space to corresponding values in a 3D seismic image from which said points originate, thereby to provide a 3D seismic image containing an indication of likely hydrocarbon location.

16. The method of claim 1, wherein said windowing is such that each of said groups comprises values received over a time interval, the method further comprising retaining for subsequent hydrocarbon identification only those of said groups having a rate of change of one attribute over time of one sign, and a rate of change of the other of said attributes over time of one predetermined sign.

17. The method of claim 16, wherein said calculating is performed, for a group, in a first plotting stage, said first plotting stage comprising:
    plotting said values following grouping, as points on a crossplot space, by crossplotting each point from one of the said attributes against a corresponding point from the second of the said attributes, said crossplot space having an origin, and
    best-fitting a line through said separate points and said origin.

18. The method of claim 17, wherein said plotting, for a group, further comprises:
    determining a trend and a group amplitude, said trend being an orientation angle of said best fit line and said group amplitude being a length of said best fit line and
    a second plotting stage of plotting said trend and said group amplitude together as a point in an angle plot space of angle against length, said point thereby representing said group.

19. The method of claim 18, further comprising dividing said angle plot space into regions representing different classes of AVO anomalies and a region representing no anomaly.

20. The method of claim 19, further comprising color-coding respective points of the angle plot space according to the color of the respective region in which they fall.

21. The method of claim 20, comprising a further stage of applying said color coding of said points from said angle plot space to corresponding inputs in a seismic section from which said points originate, thereby to provide a seismic image containing an indication of likely hydrocarbon location.

22. The method of claim 20, comprising a further stage of applying said color coding of said points from said angle plot space to corresponding inputs in a 3D seismic image from which said inputs originate, thereby to provide a 3D seismic image containing an indication of likely hydrocarbon location.

23. Seismic imaging apparatus comprising:
    an input for obtaining, for each surface location in a collection of seismic data, successive values from a plurality of seismic attributes data sets, each attribute data set comprising a respective property of said collection of seismic data,
    a windower for grouping the values using a running window of a predetermined length,
    a group parameterizer for calculating from each group of inputs group parameters representative of group behavior of said attribute values within said window, and
    a plotting unit for plotting each of said group as a single point in a space defined by said parameters.

24. The apparatus of claim 23,. wherein said plotter comprises:
    a crossplotter unit for plotting said attribute values per group as points on a crossplot space having an origin, and for best-fitting a line through said points and said origin.

25. The apparatus of claim 24, wherein said group parameterizer is interactive with said crossplotter unit to identify an orientation angle and a length of said line and to provide said angle and said length to said plotting unit, said plotting unit further comprising an angle plotter to plot said angle and said length together as a point in an angle plot space of angle against length, thereby to plot said group as an individual event.

26. The apparatus of claim 25, wherein said angle plotter is further operable to divide said angle plot space into regions representing different classes of AVO anomalies and a region representing no anomaly.

27. The apparatus of claim 26, further configured to color code said events according to the color of the respective region in which they are plotted by said angle plotter.

28. The apparatus of claim 27, further configured to apply said color coding from said events to respective values in a seismic section from which said events originate, thereby to enhance said seismic section by providing an indication of likely hydrocarbon location.

29. The apparatus of claim 27, further configured to apply said color coding from said events to respective values in a 3D seismic image from which said values originate, thereby to enhance said 3D seismic image by providing therein an indication of likely hydrocarbon location.

30. The apparatus of claim 23, wherein each group comprises values received over a time interval, the apparatus being further configured to use only those of said groups having a rate of change of one parameter over time of a first predetermined sign, and a rate of changeof a second of said parameters over time of one predetermined sign.

31. The apparatus of claim 30, wherein said plotter comprises:
    a crossplotter for plotting said groups as a seriesof crossplot points on a crossplot space having an origin, and best-fitting a line through said series of crossplot points and said origin.

32. The apparatus of claim 31, wherein said group parameterizer is interactive with said crossplotter unit to identify an orientation angle and a length of said line and to provide, said angle and said length to said plotting unit, said plotting unit further comprising an angle plotter to plot said angle and said length together as a point in an angle plot space of angle against length, thereby to plot said group as an individual event.

33. The apparatus of claim 32, wherein said angle plotter is further configured to divide said angle plot space into regions representing different classes of AVO anomalies and a region representing no anomaly.

34. The apparatus of claim 33, wherein said angle plotter is further configured to apply color coding to angleplot points according to the respective regions in which they fall.

35. The apparatus of claim 34, further comprising a seismic data analyzer associated with said plotter and wherein said plotter is configured to apply said color coding to respective values in a seismic section from which said angleplot points originate, thereby to confer upon said seismic section an indication of likely hydrocarbon location.

36. The apparatus of claim 34, further comprising a 3D seismic data analyzer associated with said plotter and wherein said plotter is operable to apply said color coding to respective values in a 3D seismic attribute from which said angleplot points originate, thereby to confer upon said 3D seismic attribute an indication of likely hydrocarbon location.

37. The apparatus of claim 23, wherein said windower is set to provide a window length to correspond to a typical wavelet duration, thereby to group together in one window successive values originating from a single seismic wavelet.

38. A method of seismic data analysis to provide clustering of A.V.O. data into A.V.O. anomaly types, the method comprising:
obtaining, for each surface location in a collection of seismic data, successive values of a plurality of seismic attributes data sets, each seismic attribute data set comprising a respective property of said collection of seismic data,
grouping said values using a running window of a predetermined size into a plurality of groups,
for each group calculating first and second parameters corresponding to group behavior of said group within said window, and
plotting each group as a single point, in a space defined by said group parameters, said group parameters having been selected to cause clustering of said seismic reflection events on said plot according to the presence or absence of A.V.O. anomalies.

* * * * *